US009963089B2

(12) United States Patent
Torrey, Jr. et al.

(10) Patent No.: US 9,963,089 B2
(45) Date of Patent: May 8, 2018

(54) SYSTEM FOR SELECTIVELY EXTENDING AND RETRACTING A LICENSE PLATE HOLDER

(71) Applicant: Tego Automotive Products Inc., Westlake Village, CA (US)

(72) Inventors: Neil G. Torrey, Jr., Simi Valley, CA (US); Amir Fathi, Westlake Village, CA (US)

(73) Assignee: Tego Automotive Products Inc., Westlake Village, CA (US)

( * ) Notice: Subject to any disclaimer, the term of this patent is extended or adjusted under 35 U.S.C. 154(b) by 0 days. days.

(21) Appl. No.: 15/453,067

(22) Filed: Mar. 8, 2017

(65) Prior Publication Data

US 2017/0259758 A1    Sep. 14, 2017

Related U.S. Application Data

(60) Provisional application No. 62/307,869, filed on Mar. 14, 2015.

(51) Int. Cl.
*B60R 13/10* (2006.01)
*F16M 13/00* (2006.01)

(52) U.S. Cl.
CPC .......... *B60R 13/105* (2013.01); *B60R 13/10* (2013.01); *F16M 13/00* (2013.01)

(58) Field of Classification Search
CPC .............................. B60R 13/105; B60R 13/10
USPC .................... 248/480, 917, 424; 40/200, 211
See application file for complete search history.

(56) References Cited

U.S. PATENT DOCUMENTS

| 4,402,482 | A | * | 9/1983 | Harbaugh | G01M 11/04 248/424 |
| 4,453,328 | A | | 6/1984 | Connolly | |
| 4,858,874 | A | * | 8/1989 | Wright | B60R 1/006 248/284.1 |
| 5,447,352 | A | * | 9/1995 | Ito | B60N 2/0232 248/424 |
| 6,131,871 | A | * | 10/2000 | Bernhardt | B60N 2/067 248/424 |
| 6,511,032 | B1 | * | 1/2003 | Lee | B60N 2/0705 248/424 |

(Continued)

FOREIGN PATENT DOCUMENTS

| CN | 102700477 A | 10/2012 |
| GB | 2121225 A | 12/1983 |
| WO | 2011013113 A1 | 2/2011 |

OTHER PUBLICATIONS

Sto N Sho Quick Release Front License Plate Bracket; www.bigmikesperformanceparts.com website.

(Continued)

*Primary Examiner* — Muhammad Ijaz
(74) *Attorney, Agent, or Firm* — Kelly & Kelley, LLP

(57) ABSTRACT

A system for selectively extending and retracting a license plate holder includes a housing defining a slide rail attachable to a vehicle. A motor selectively rotates a threaded driver extending through first and second sliders within the housing a first or second rotational direction so as to move the first and second sliders within the housing. As the first and second sliders are moved within the housing, a license plate mount pivotally attached to the first slider is extended from under the vehicle or retracted beneath the vehicle.

20 Claims, 21 Drawing Sheets

(56) References Cited

U.S. PATENT DOCUMENTS

| | | | |
|---|---|---|---|
| 6,796,060 | B1 | 9/2004 | Meester et al. |
| 7,090,186 | B2 * | 8/2006 | Quinno ............... B60R 11/0235 248/323 |
| D545,259 | S | 6/2007 | Stahel, Jr. et al. |
| 7,810,779 | B2 * | 10/2010 | Jessup .................. B60N 2/0881 248/424 |
| 7,818,905 | B1 * | 10/2010 | Stahel ................... B60R 13/105 224/496 |
| 8,136,854 | B2 | 3/2012 | Rich |
| 8,245,996 | B1 * | 8/2012 | Ciabaszewski ....... B60R 13/105 248/286.1 |
| 8,356,852 | B2 | 1/2013 | Lucas et al. |
| 8,464,993 | B2 * | 6/2013 | Muraishi ................ B60N 2/067 248/424 |
| 8,887,421 | B1 | 11/2014 | Halula |
| 9,056,590 | B2 | 6/2015 | McKinney |
| 2003/0205101 | A1 | 11/2003 | Harmon |
| 2015/0029078 | A1 | 1/2015 | Jose |
| 2017/0259758 | A1 * | 9/2017 | Torrey, Jr. ............. B60R 13/105 |
| 2017/0320451 | A1 * | 11/2017 | Honaker ............... F16B 35/005 |

OTHER PUBLICATIONS

Show 'N' Go Powered License Plate Transport; www.altecproducts.com website.

* cited by examiner

SYSTEM FOR SELECTIVELY EXTENDING AND RETRACTING A LICENSE PLATE HOLDER

RELATED APPLICATION

This application claims priority to U.S. Provisional Application No. 62/307,869, filed on Mar. 14, 2016.

BACKGROUND OF THE INVENTION

The present invention generally relates to front license plate positioning brackets. More particularly, the present invention relates to a system for selectively extending and retracting a license plate mount.

Many states in the United States require an automobile to have a license plate mounted to the front of the vehicle. Some vehicles are sold with a license plate mounting bracket attached to the front of the vehicle, typically to the front bumper. However, others do not, which requires that the owner of the vehicle drill holes into the bumper and mount a license plate bracket for holding the license plate therein.

In any event, many people share the opinion that the presence of the license plate on the front bumper is unsightly and detracts from the image of the vehicle. This is particularly the case with automobile aficionados who like to show their cars, such as at car shows and other similar events. These automobiles often have custom paint schemes, custom wheels, special neon lights, added body panels, etc. and the mounting of a license plate bracket onto the front of the vehicle can damage these enhancements as well as making the vehicle unsightly in appearance.

As such, many people do not want to draw attention to such license plates, and will go out of their way to remove them while at shows or gatherings. This often requires the time-consuming process of removing the plates and then replacing them to drive back home. Of course, as many cars must add holes and bushings to allow the license plate bracket to be attached to the vehicle, such holes, bushings and the like are still viewable and unsightly.

In response, there have been devised various retractable vehicle accessories, including accessories which extend and retract license plates. However, such systems and mechanisms all have various shortcomings and drawbacks.

Accordingly, there is a continuing need for a system for selectively extending a license plate holder or mount from beneath a vehicle and selectively retracting the license plate mount beneath the vehicle, which overcomes these shortcomings and drawbacks. The present invention fulfills these needs, and provides other related advantages.

SUMMARY OF THE INVENTION

The present invention relates to a system for selectively extending and retracting a license plate holder. More particularly, the system permits a user thereof to selectively extend a license plate holder, and thus a license plate, from beneath a vehicle to a position where it can be clearly seen, such as a front end of the vehicle. The system also selectively allows a user to retract the license plate holder, and thus the license plate, beneath the vehicle so that it is not visible, such as when showing the vehicle at a car show or the like.

The system generally comprises a housing comprising a slide rail attachable to a vehicle. A threaded driver is disposed within the slide rail. A motor is coupled to the threaded driver for selectively rotating the threaded driver a first rotational direction or a generally opposite second rotational direction.

A first slider is slidably disposed within the slide rail and operably coupled to the driver so as to move first and second generally opposite directions along a length of the driver as the driver is rotated. A license plate mount is pivotally attached to the first slider. As the driver is rotated the first rotational direction and the slider is moved the first direction a predetermined distance, the license plate mount pivots to an extended position. As the driver is rotated the second rotational direction and the first slider is moved the second direction, the license plate mount pivots to a retracted position.

Typically, a second slider is also disposed within the slide rail in spaced relation to the first slider and operably coupled to the driver to move first and second generally opposite directions along a length of the driver as the driver is rotated. At least one link extends between the second slider and the license plate mount. As the distance between the second slider and the license plate mount becomes less than a length of the link, the license plate mount pivots to the extended position. Similarly, when the driver is rotated in the opposite direction and the second slider is moved away from the license plate mount, the license plate mount pivots to the retracted position.

A spring may be disposed between the first and second sliders for biasing the first and second sliders in spaced relation to one another. A stop may limit the travel of the first slider in the first direction. A sensor may detect a position of the first slider and/or the second slider.

An inner slide rail may be slidably disposed within the housing. The first slider and the second slider are slidably disposed within the inner slide rail. A stop may be used to limit the travel of the inner slide rail within the housing.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIGS. 6a-6c illustrate screenshots showing the control and operation of the assembly of the present invention and the present and past status thereof;

DETAILED DESCRIPTION OF THE PREFERRED EMBODIMENTS

As shown in the accompanying drawings, for purposes of illustration, the present invention resides in a system for selectively extending a license plate to be viewed in front of an automobile, and retracting the license plate under the vehicle. Where local laws require that the vehicle have a license plate prominently displayed at the front of the vehicle, the present invention can be actuated so as to extend the license plate, such as when driving the automobile. However, when not driving, such as at shows and the like, the system of the present invention can be used to retract the license plate underneath the car so that it is not visible and does not detract from the appearance and image of the automobile. This can be easily and conveniently done using an electronic device, such as a handheld FOB, smart phone or the like.

Figure 1:
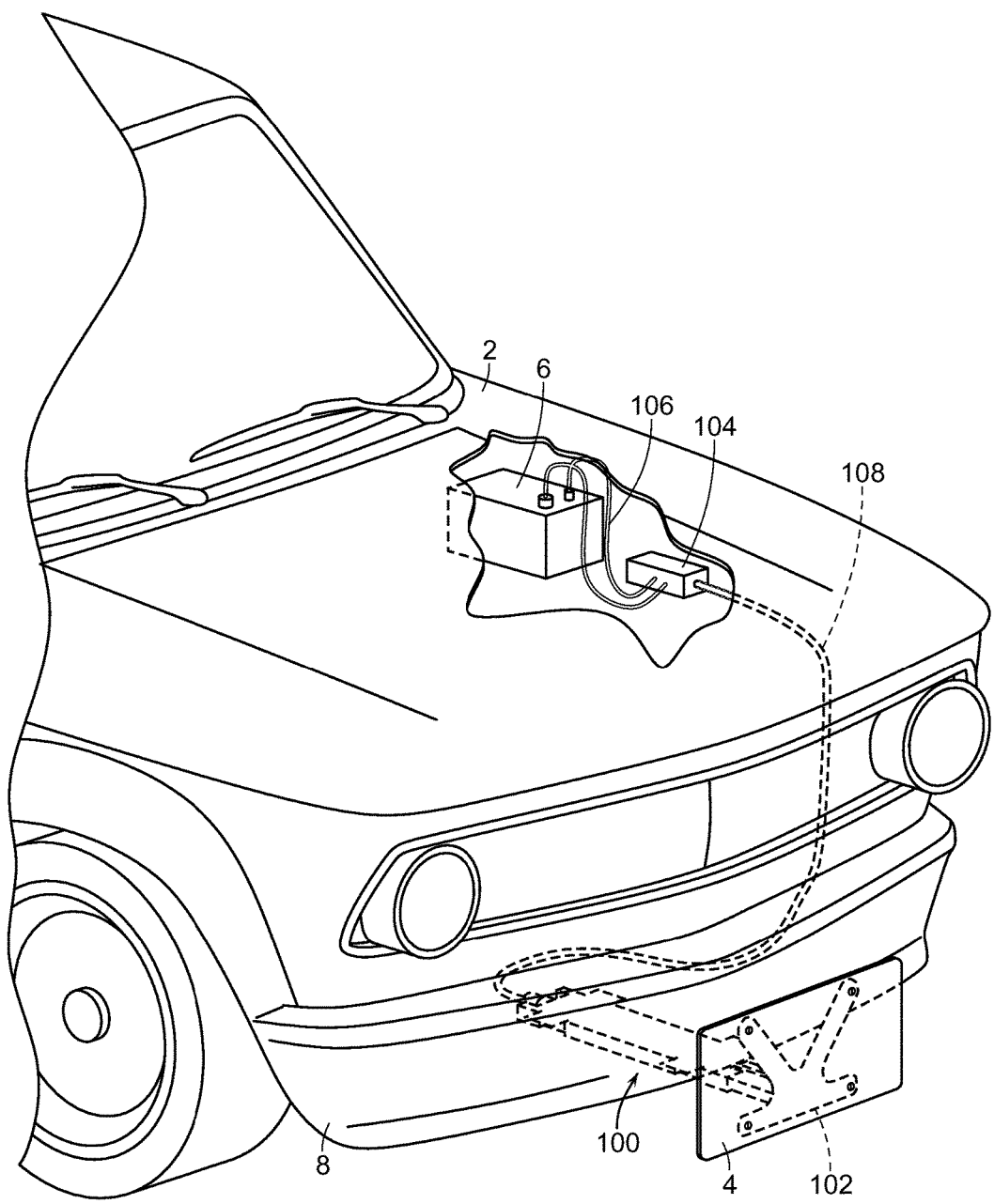
FIG. 1 is a partial perspective and diagrammatic view of a system for selectively extending and retracting a license plate holder embodying the present invention and operably coupled to a vehicle, with a license plate and mount in a fully extended state, in accordance with the present invention.
Figure 2:
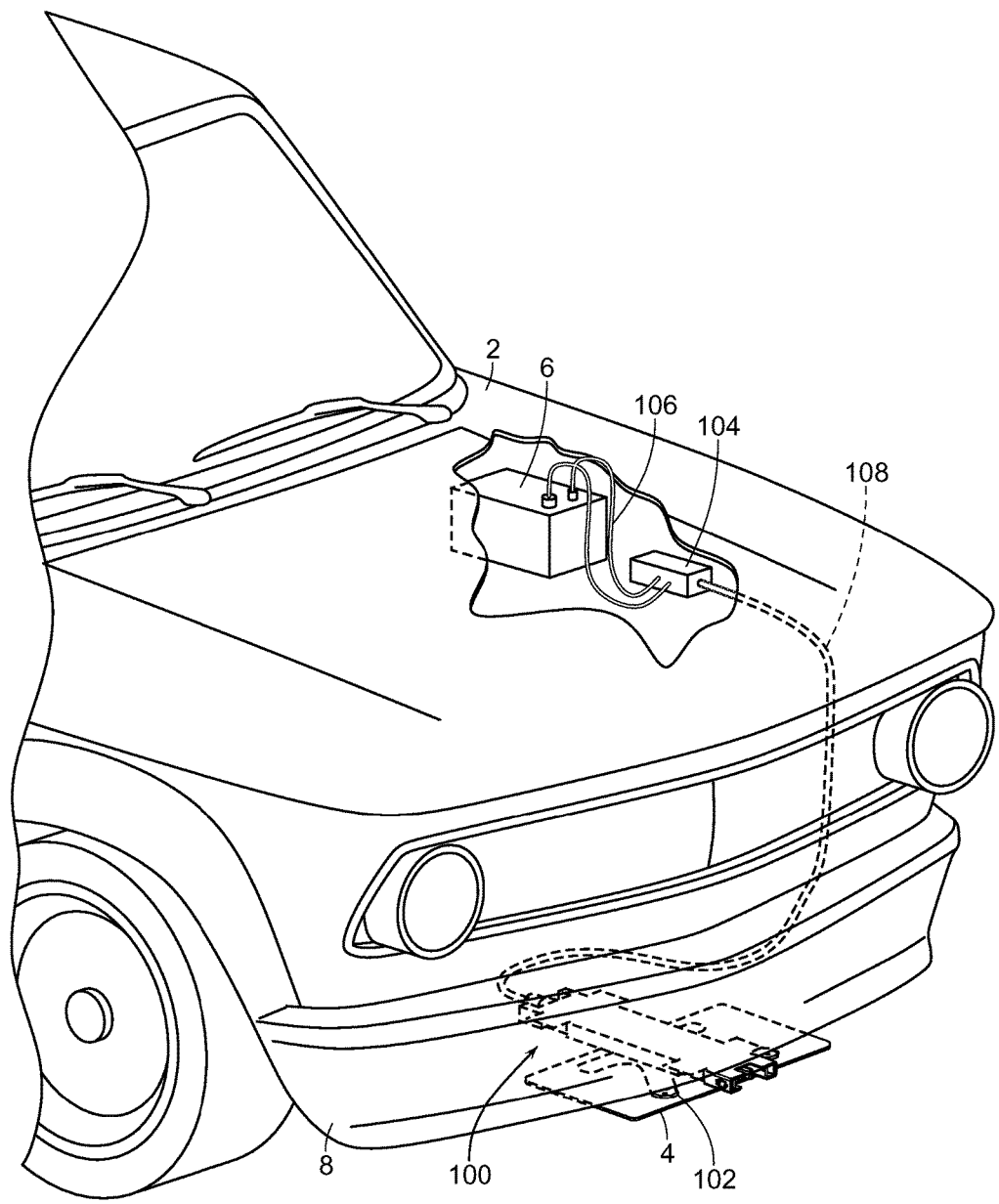
FIG. 2 is a view similar to FIG. 1, but illustrating the license plate retracted under the vehicle.

With reference now to FIGS. 1 and 2, an assembly 100 of the system of the present invention is installed under the vehicle 2, adjacent to a front end, typically adjacent to and/or underneath a bumper 8 of the vehicle 2, such that upon actuation a license plate 4 held by a bracket or mount 102 of the assembly 100 can be fully extended so as to be viewable, as illustrated in FIG. 1, or fully retracted, as illustrated in FIG. 2, so as to not be visible from the front of the car 2.

As mentioned above, the extension or retraction of the license plate 4 can be done selectively and remotely, such as within the car or when near the car 2. A receiver 104 is mounted within the car 2, typically near a battery 6 of the car 2, so as to have leads 106 which attach to terminals of the battery 6 so as to provide power to the receiver 104 as well as the motorized assembly 100. An electrical lead 18 extends between the receiver 104 and the assembly 100 to provide power thereto and also signals between the receiver 104 and the assembly 100. The receiver may be Bluetooth enabled so as to receive Bluetooth signals from the keychain FOB, cell phone, or the like.

Figure 3:
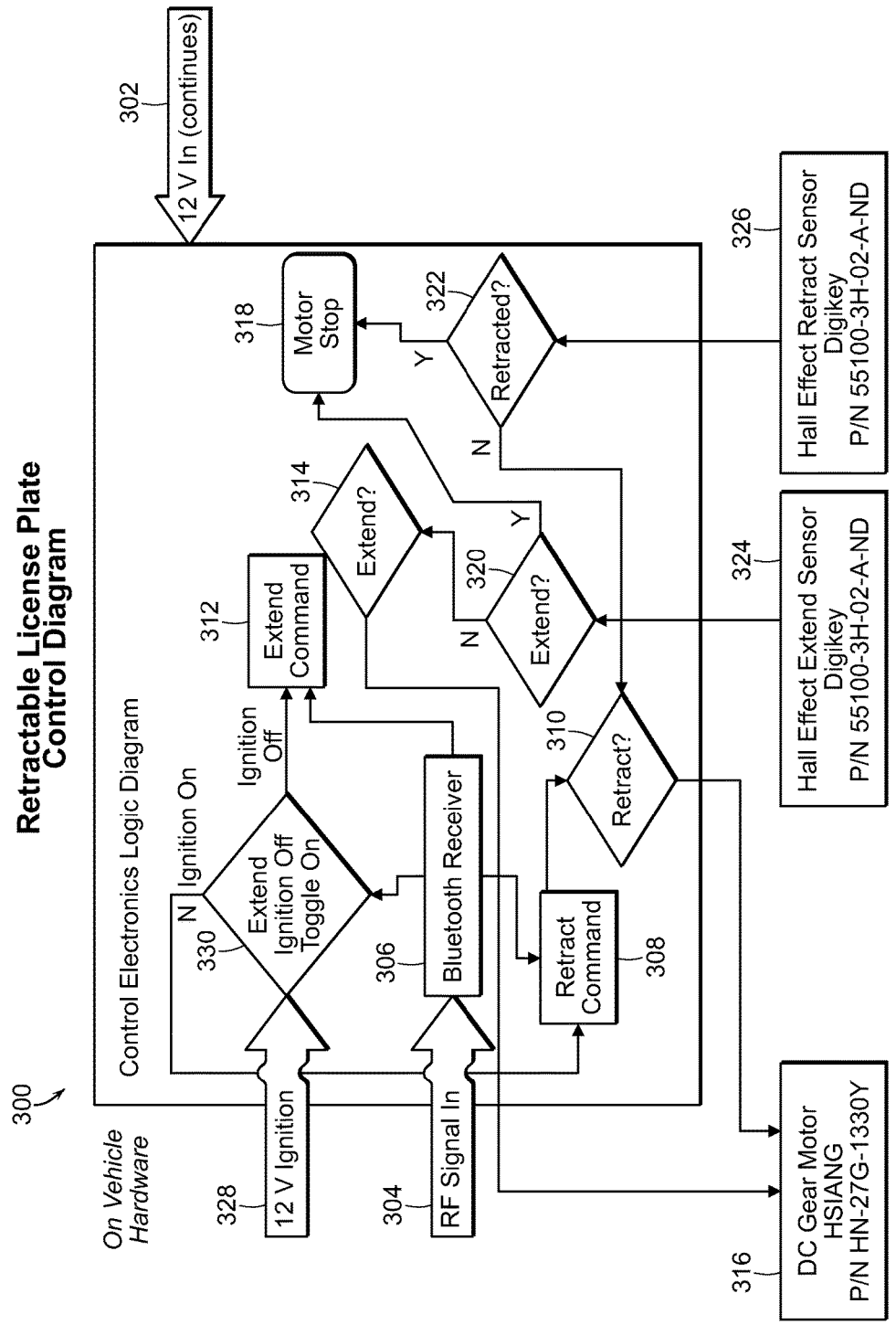
FIG. 3 is a diagram illustrating the control steps taken in accordance with the present invention.

With reference now to FIG. 3, a control diagram 300 is shown of the control electronics which are used in accordance with the present invention. As discussed above, voltage 302 is supplied by the battery of the vehicle 2. This may be used, for example, to power the receiver 104 to receive signals from a remote control device, provide power to a motor of the assembly 100, etc. A wireless signal, such as a radio frequency signal 304 may be received by the Bluetooth receiver 306 to selectively retract or extend the license plate, such as when the user activates the electronic switch of a FOB to send such signal, or through his smart phone or the like. The command may be a retract command 308, at which point the system determines whether the license plate is retracted 310. Similarly, if the command or signal is for extending the license plate, an extend command 312 is given and the system determines whether the license plate is extended 314.

A direct current gear motor 316, or other electric motor, is then actuated as needed to retract or extend the license plate. The motor 318 is stopped when it is determined that the license plate is either fully extended 320 or fully retracted 322. This may be done, for example, by means of sensors 324 and 326 which are activated or otherwise sensed when the license plate 4 is fully extended or retracted, respectively. In FIG. 3, reference is made to a specific DC gear motor and Hall effect sensors, although it will be appreciated that different electric motors and sensors may be used in accordance with the present invention as deemed desirable or necessary.

With continuing reference to FIG. 3, the present invention may also be actuated according to whether the ignition of the car has been turned on or off, and thus whether the car is running. When the car ignition is on or turned off 328, the state 330 is determined at step 330. The assembly and system of the present invention may extend the license plate if the ignition is turned on and the car is running, but may retract the license plate 4 if the ignition is turned off and the car is stopped. This could be a default safety measure, for example, in order to meet local laws requiring that the front license plate be displayed when the car is driven.

Figure 4:
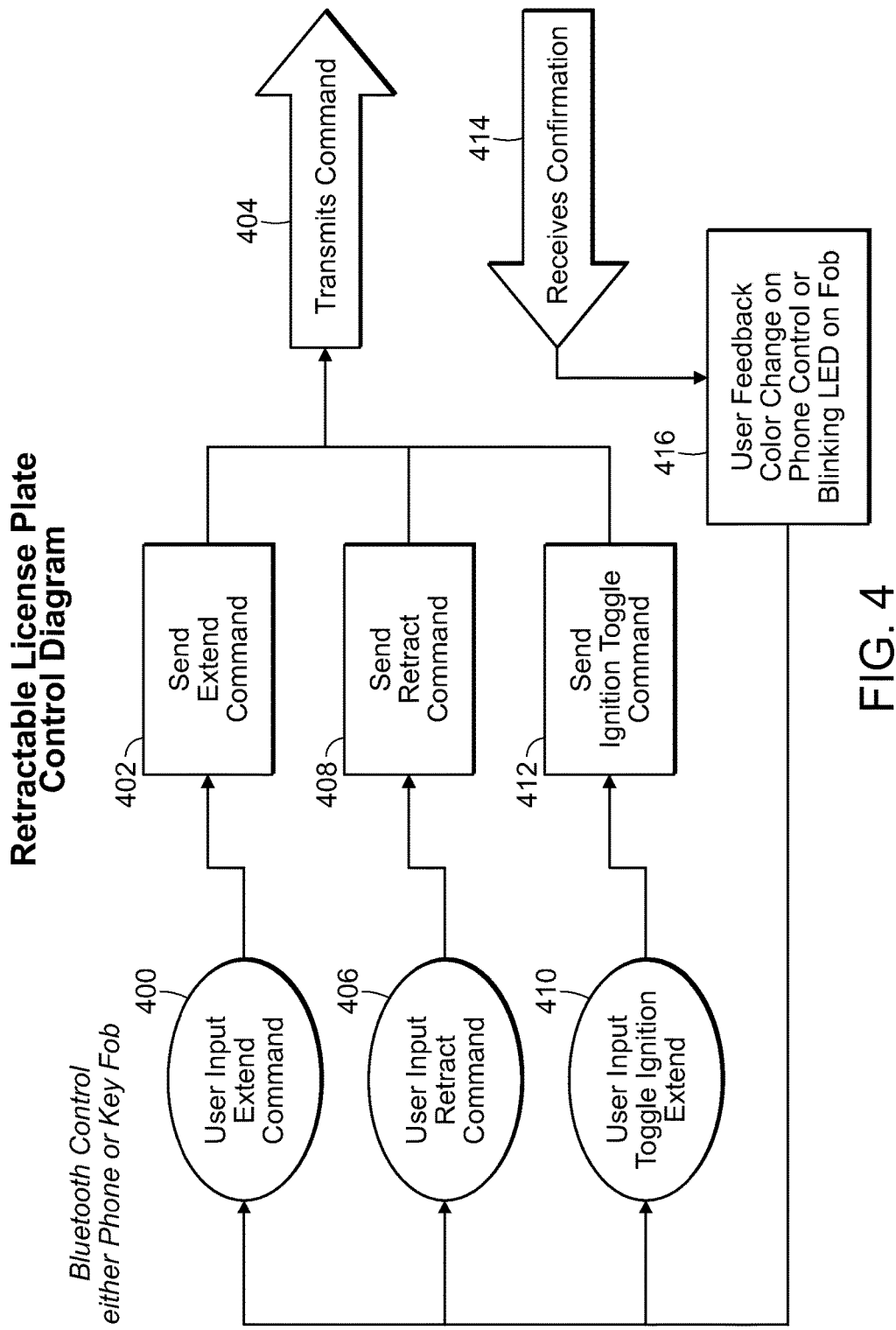
FIG. 4 is another diagram illustrating control steps taken in extending and retracting a license plate in accordance with the present invention.

With reference now to FIG. 4, another control diagram for the retractable license plate system of the present invention is shown. Using a key FOB, an application on a smart phone, or the like, the user may input an extend command 400, which will result in a wireless signal being sent 402, which is then transmitted 404 to the receiver. Alternatively, the user may input the retract command 406, in which case the retract command is sent 408 and transmitted 404. The user may input toggle ignition extend, such as when the car is to be either wirelessly started, or the car ignition is turned on or off which will automatically extend or retract the license plate, as described above, which will result in a send ignition toggle command 412 being generated and the command being transmitted 404. Preferably, the user will receive a confirmation 414, such as a color change on the phone control, blinking LED on the FOB or the like 416 so that the user knows that the command has been sent.

Figure 5:
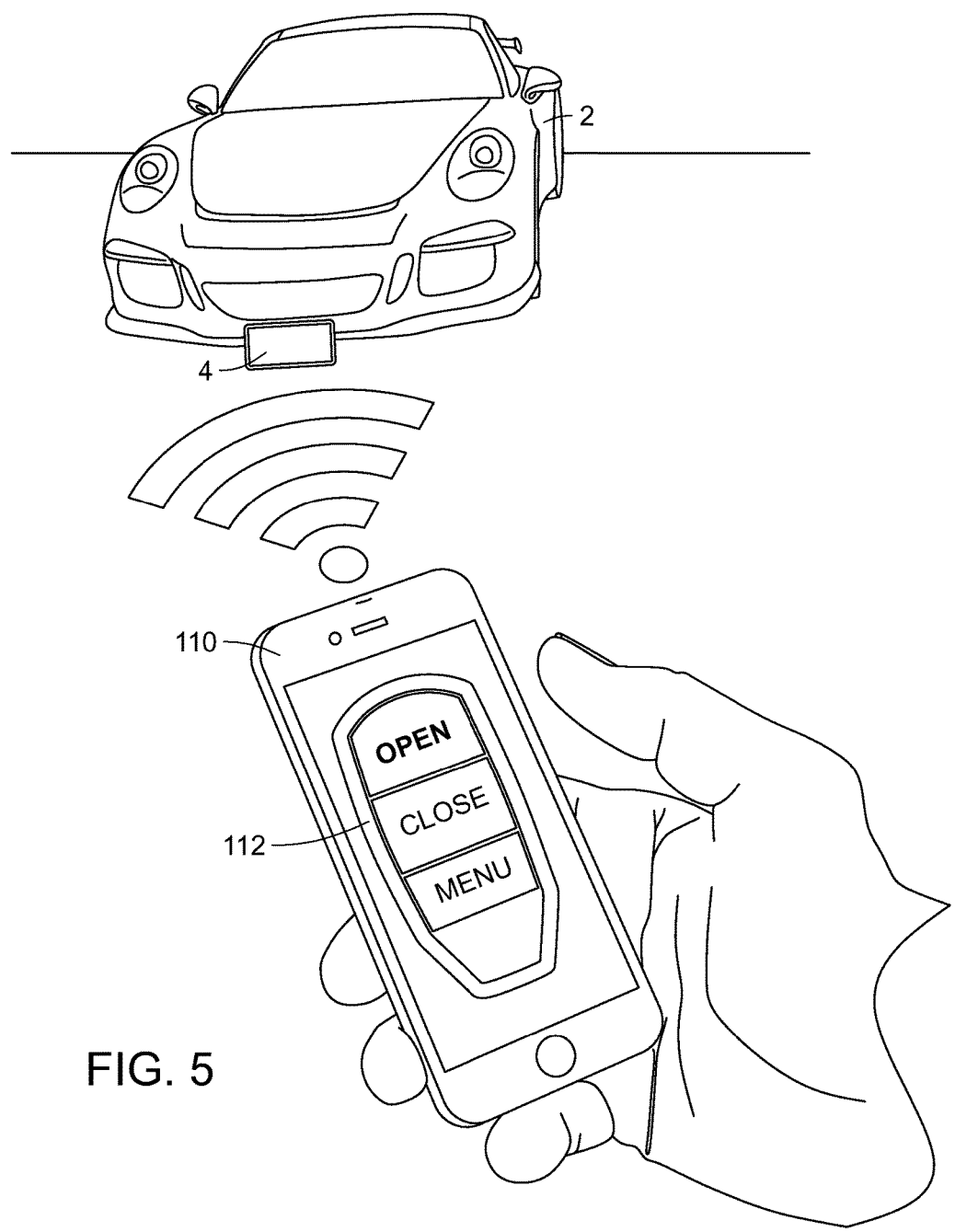
FIG. 5 is a perspective and diagrammatic view illustrating a handheld electronic device having a software application downloaded thereto enabling a user to remotely extend and retract the license plate mount of the present invention.

With reference now to FIG. 5, in a particularly preferred embodiment the handheld electronic device used to actuate the assembly 100 to extend or retract the license plate 4 comprises a smart phone 110 having a display screen 112 enabling the user to select various commands, such as "open", "close", "menu", etc. provided through a software application downloaded onto the smart phone 110. Typically, a software application will provide digital buttons which can be selected and operated by means of the touch screen 112 and which are easy and intuitive for the user to select, such as "open" and "close". As mentioned above, visual and/or haptic feedback may be provided to alert the user that his or her command has been processed and is being conveyed to the assembly 100 and components of the system of the present invention so as to extend or "open" or retract or "close" the license plate mount 102 of the assembly 100, and thus the license plate 4.

Figures 6A, 6B, 6C:
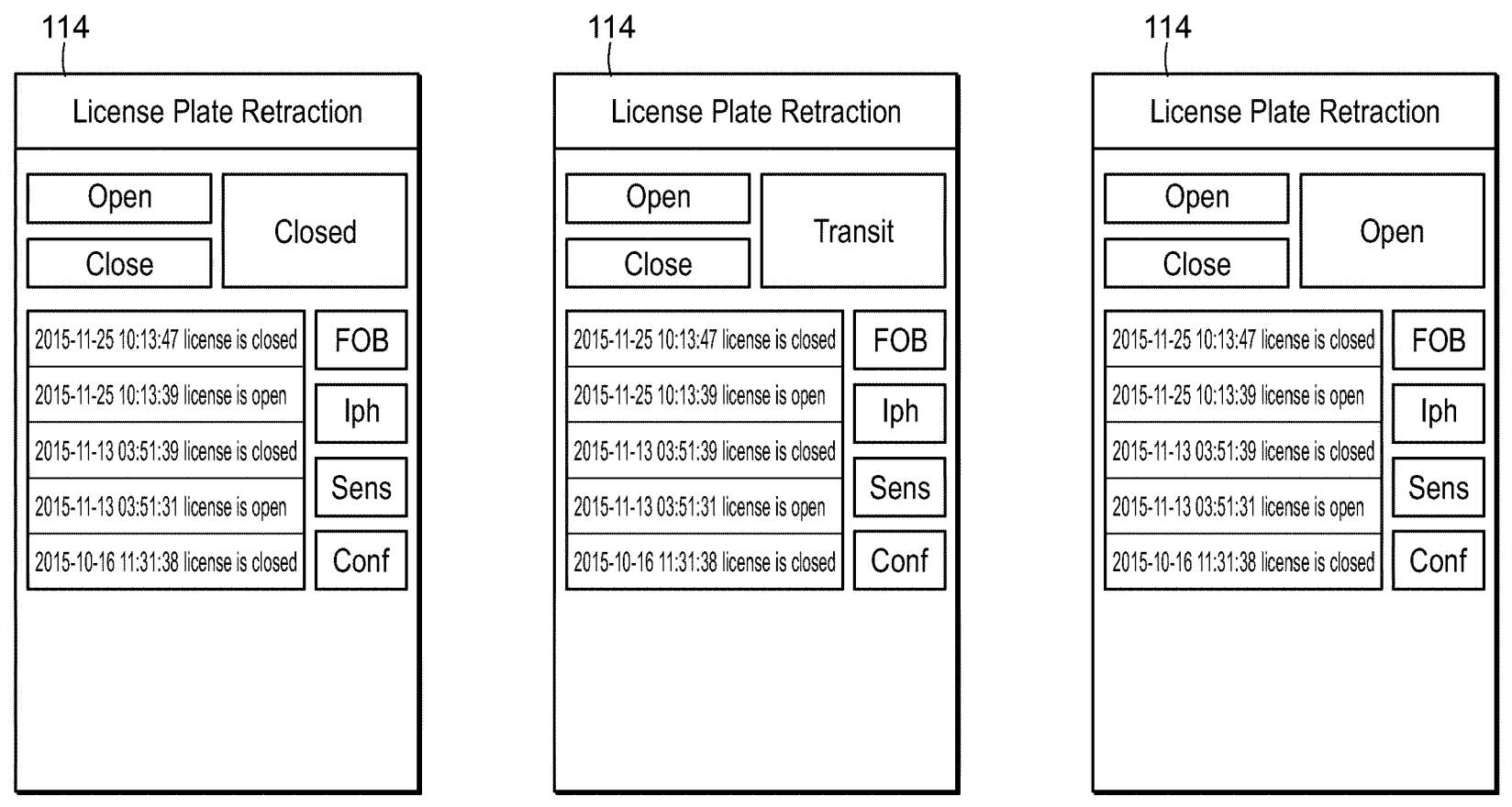

With reference to FIGS. 6a-6c, screenshots 114 are shown of the state of the license plate, whether it has been opened, closed, is in transit, etc. This may be done by the selective command of the user through a FOB, smart phone or the like, or by means of sensors which detect an obstruction or the like and extend or retract the license plate, by turning the ignition on or off, etc. The time and date when the license plate was closed or opened may be determined. This may be viewable such a through a software application on the smart phone 110, or may be able to be retrieved from electronic circuitry of the system, such as that disposed within the receiver housing.

Figure 7:
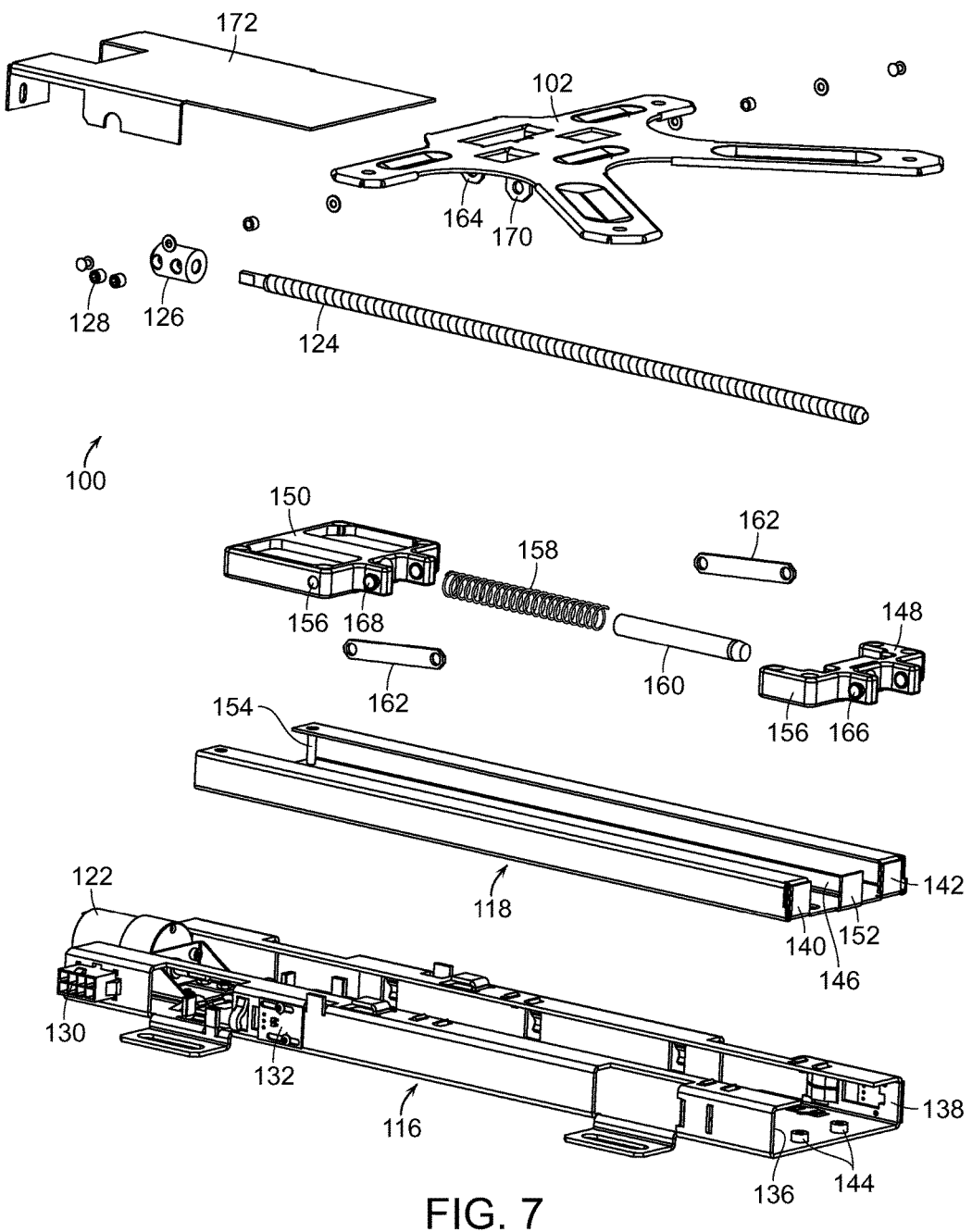
FIG. 7 is an exploded perspective view of an assembly embodying the present invention.
Figure 8:
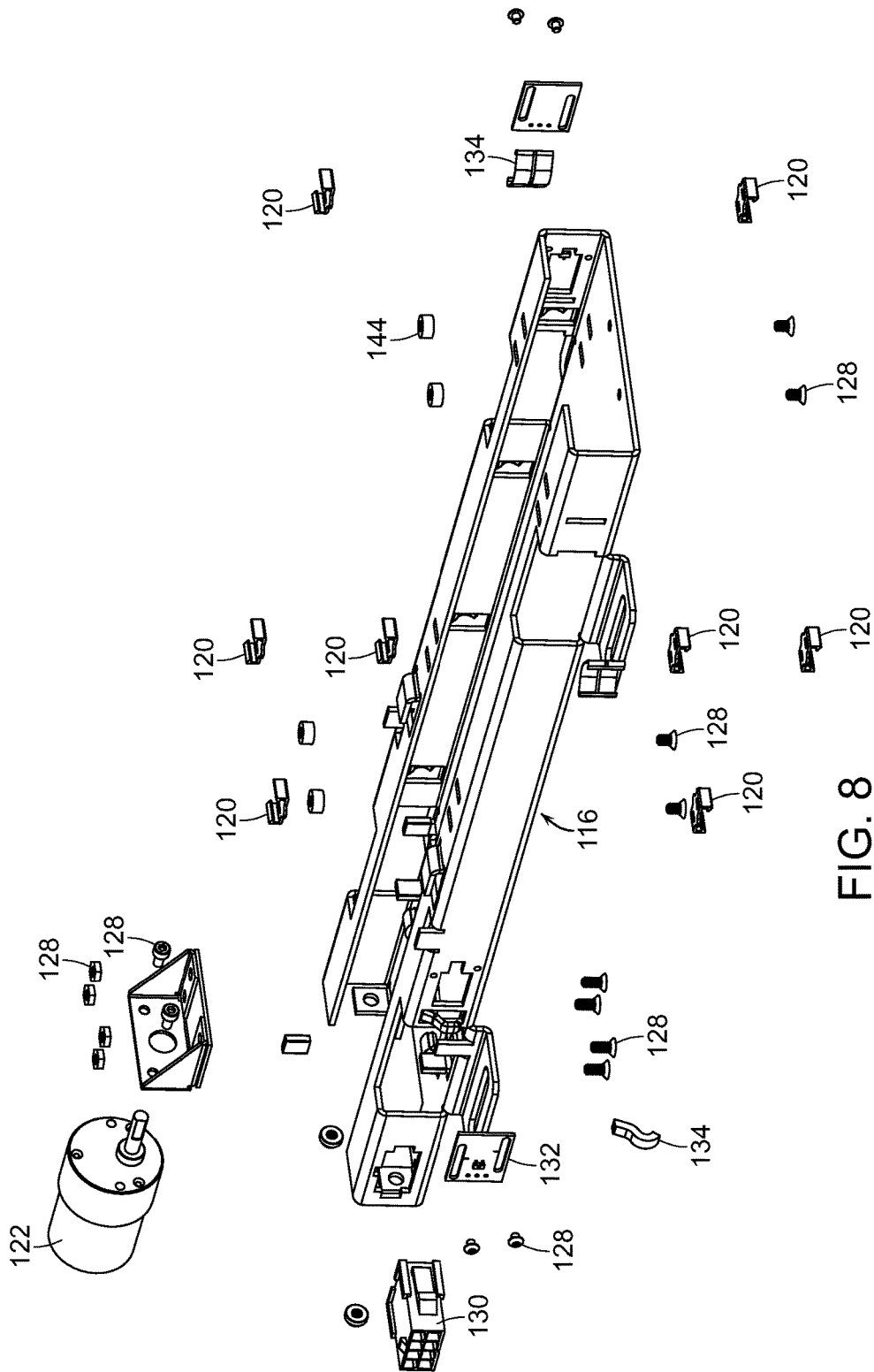
FIG. 8 is an exploded perspective view illustrating component parts of a main housing slide rail of the assembly of FIG. 7.

With reference now to FIGS. 7 and 8, an exploded view of an assembly 100 embodying the present invention is shown. An outer housing 116 is attachable to the vehicle 2. The outer housing 116 has a configuration so as to be generally C-shaped in cross-section so as to define an outer slide rail. An inner housing or slide rail 118 is slidably disposed within the outer housing 116. Anti-friction or bearing pads 120 are preferably disposed between the outer and inner housings 116 and 118, so as to guide the travel of the inner housing slide rail 118, while preventing the inner slide rail housing 118 and outer housing 116 from binding and preventing excess of wear during repeated operation. For example, anti-friction pads 120 may be installed at the front portion of the outer housing and anti-friction pads 120 installed at the mid portion of the outer housing at the point where the inner slide rail housing 118 is fully extended. This ensures that the inner slide rail housing 118 is making full contact with the anti-friction pads 120 at all times during the travel of the inner slide rail 118.

A motor 122 receives power from the car's battery 6, as described above. The motor 122 is coupled to a threaded driver 124, such as a screw drive or worm gear, such as by means of coupling 126 and fasteners 128 and driver 124. A connector 130 can be used to provide electricity to the motor 122 and receive electrical signals from various electronic components associated with the assembly 100. For example, the connector 130 may provide one or more electrical leads to a circuit board 132 which receives electrical signals or data from sensors 134 which may indicate the positions of the moving parts of the assembly 100 so as to detect when the license plate mount or holder 102 is in a fully retracted or a fully extended position, if there are any obstructions preventing the license plate holder from traveling its full path in order to fully retract or extend, etc. Such sensors may comprise a Hall sensor, such as for detecting magnets or the like, optical sensors, pressure sensors, or even other mechanical sensors which detect positions of various components of the assembly 100.

Figure 10:
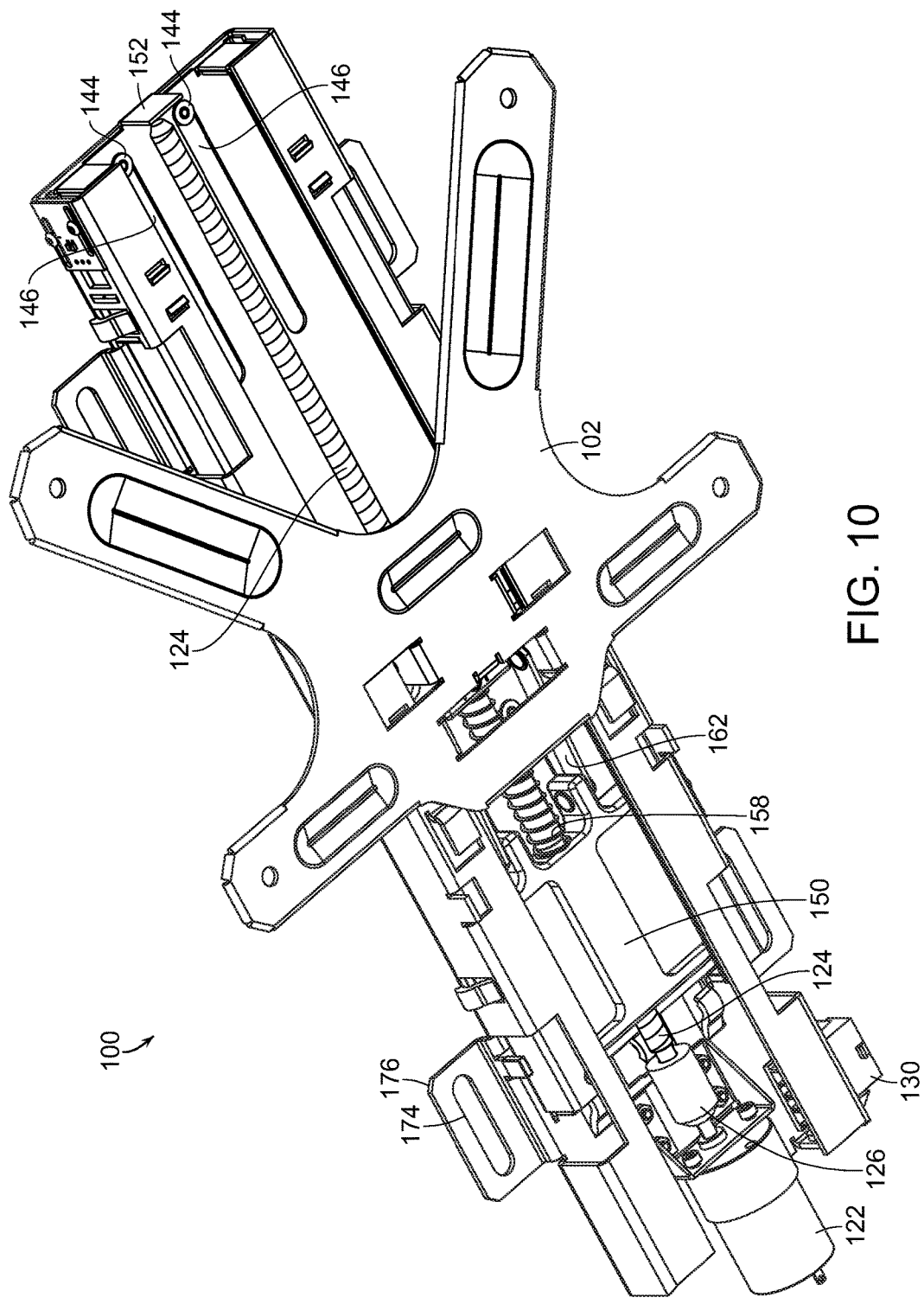
FIG. 10 is a bottom perspective view of the assembly in a fully retracted position.
Figure 12:
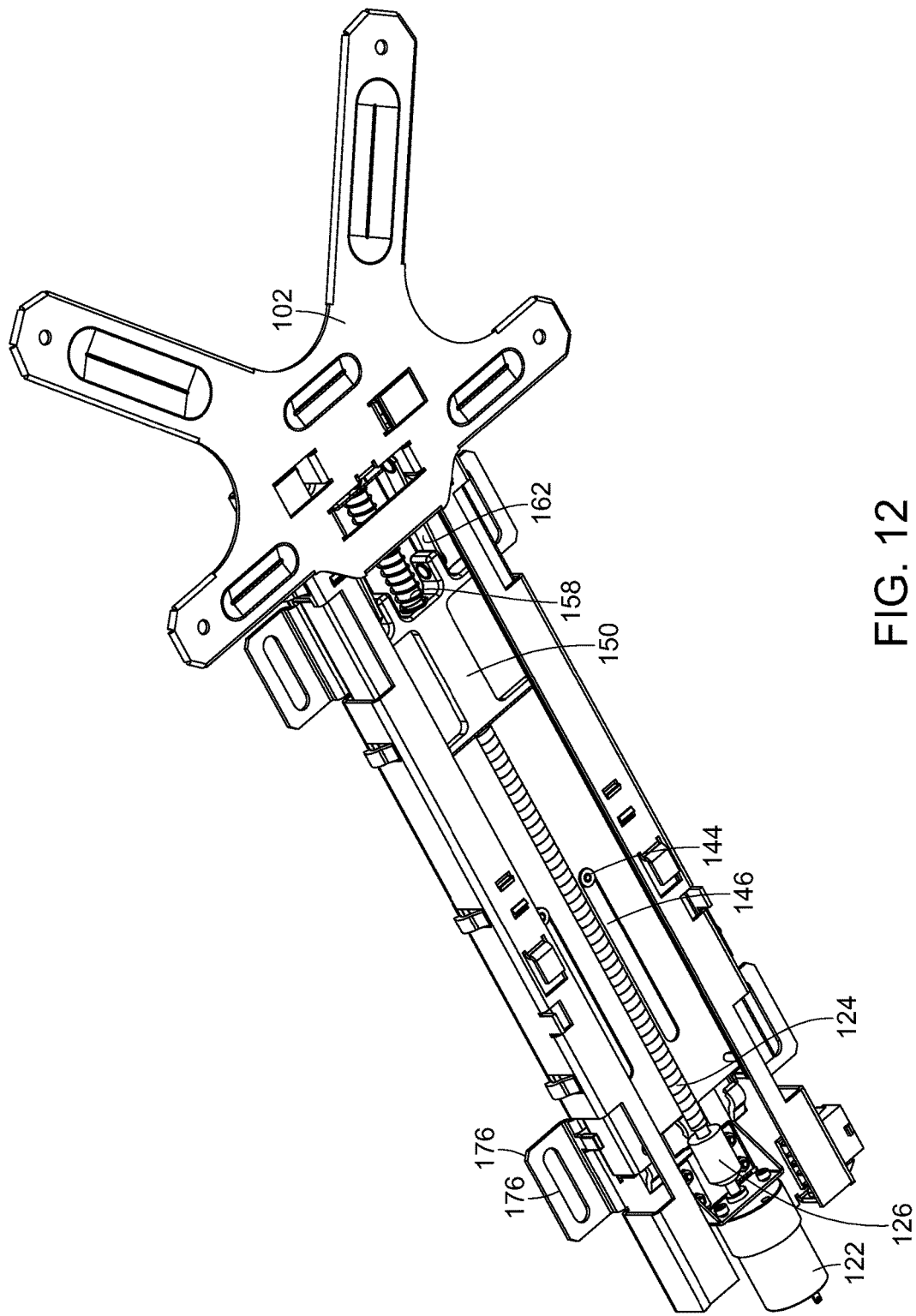
FIG. 12 is a bottom perspective view similar to FIG. 11.

The inner slide rail 118 is slidably disposed within the outer housing or outer slide rail 116. The outer slide rail 116 has side channels 136 and 138 into which the opposing side channels 140 and 142 of the inner slide rail 118 are slidably disposed. The outer slide rail 116 includes stops 144 which extend into elongated slots 146 of the inner slide rail 118, such as illustrated in FIGS. 10 and 12, to limit the path of travel of the inner slide rail 118 with respect to the outer slide rail or outer housing 116, as will be more fully described herein.

A first slider 148 and a second slider 150 are slidably disposed within the inner slide rail 118. The threaded driver 124 extends through threaded internal apertures of the first and second sliders 148 and 150 such that as the driver 124 is rotated in a first direction by the motor 122 the sliders 148 and 150 are moved a first direction, such as away from the motor 122 and toward an open or front end of the outer housing 116, and when the motor 122 reverses the rotational direction of the driver 124 the sliders 148 and 150 are moved an opposite direction, such as towards the back end of the housing 116 or motor 122. The inner slide rail 118 includes a front stop 152 for limiting the travel of the sliders, and particularly the first slider 148. The inner slide rail 118 also includes back stops 154 which also limits the rearward travel of the sliders, and particularly the second slider 150.

As discussed above, the assembly 100 typically includes sensors which will detect the position of the first and second sliders 148 and 150, such as when they are positioned in their forward-most position and rearward-most position. This may be accomplished in a variety of means, but in one embodiment the sliders 148 and 150 include magnets 156 embedded therein which are detectable by the sensors 134. When the sensors 134 detect a predetermined position of the first slider 148 and/or second slider 150, such detection may be used, for example, to cease rotation of the driver 124, such as by ceasing power to the motor 122. Moreover, if the driver 124 has been rotated for a predetermined period of time or predetermined number of rotations or the like and the slider 148 or 150 does not arrive at its intended position, the circuitry 132 of the assembly 100 may determine that there is an obstruction or other jam within the assembly preventing the sliders 148 or 150 or inner slide rail 118 from freely sliding along its predetermined length of path and travel. Such a condition could be relayed to the user, such as through the smart phone software application or other handheld device or electronic screen or the like.

The first slider 148 and second slider 150 are in spaced relation to one another. Typically, a spring 158 extends between the first slider 148 and second slider 150 so as to bias the sliders 148 and 150 in spaced relation to one another. A support 160 may be attached to one of the sliders 148 or 150 for supporting the coil spring 158 thereon. The support 160 may be hollow so as to permit the driver 124 to extend therethrough. The sliders 148 and 150 include side edges which reside within the side channels 140 and 142 and retain the sliders 148 and 150 within the inner slide rail 118. The sliders 148 and 150 travel at least a portion of the length of the inner slide rail 118 as the driver 124 is rotated in either the first or second direction.

The license plate mount or holder 102 is operably coupled, such as by pivotal connection, to the first slider 148, such as by pivotally connecting members 164 of the license plate mount 102 to members 166 of the first slider 148. The pivotal connection between connecting points or members 164 and 166 enables the license plate mount 102 to be pivoted between the extended and retracted positions as the first slider 148 is moved in a first direction towards the end of the slide rail 118 and retracted in a second direction into the slide rail 118.

Links 152 are pivotally connected to the second slider 150 at a first end thereof, such as at connecting point or member 168, and pivotally connected to the license plate mount or holder 102, such as at connecting point or member 170. The links 162 will cause the license plate mount 102 to pivot into an extended position as the second slider 150 is moved towards the first slider 148 and the first slider 148 is at the stop 152. Conversely, as the second slider 150 is moved away from the first slider 148, the links 162 will pull upon the license plate holder 102 and cause it to pivot into a retracted position. The pivotal connection between the first slider 148 and license plate holder 102 and links 162 and the second slider 150 may be by means of bolt-and-nut connection or the like.

A cover 172 may be attached to the outer housing 116 so as to protect various component parts thereof and also to prevent dust, rocks and dirt and other debris from entering into the assembly. The cover 172 may extend substantially a length of the outer housing or slide rail 116, or only over a portion thereof, such as to protect sensitive items including the circuit board 132 and the like. The cover 172 is illustrated in FIG. 7, but omitted in various other drawings for purposes of illustration such that the internal components can be viewed, although it will be understood that a cover 172 is typically incorporated and utilized by the invention.

Figure 9:
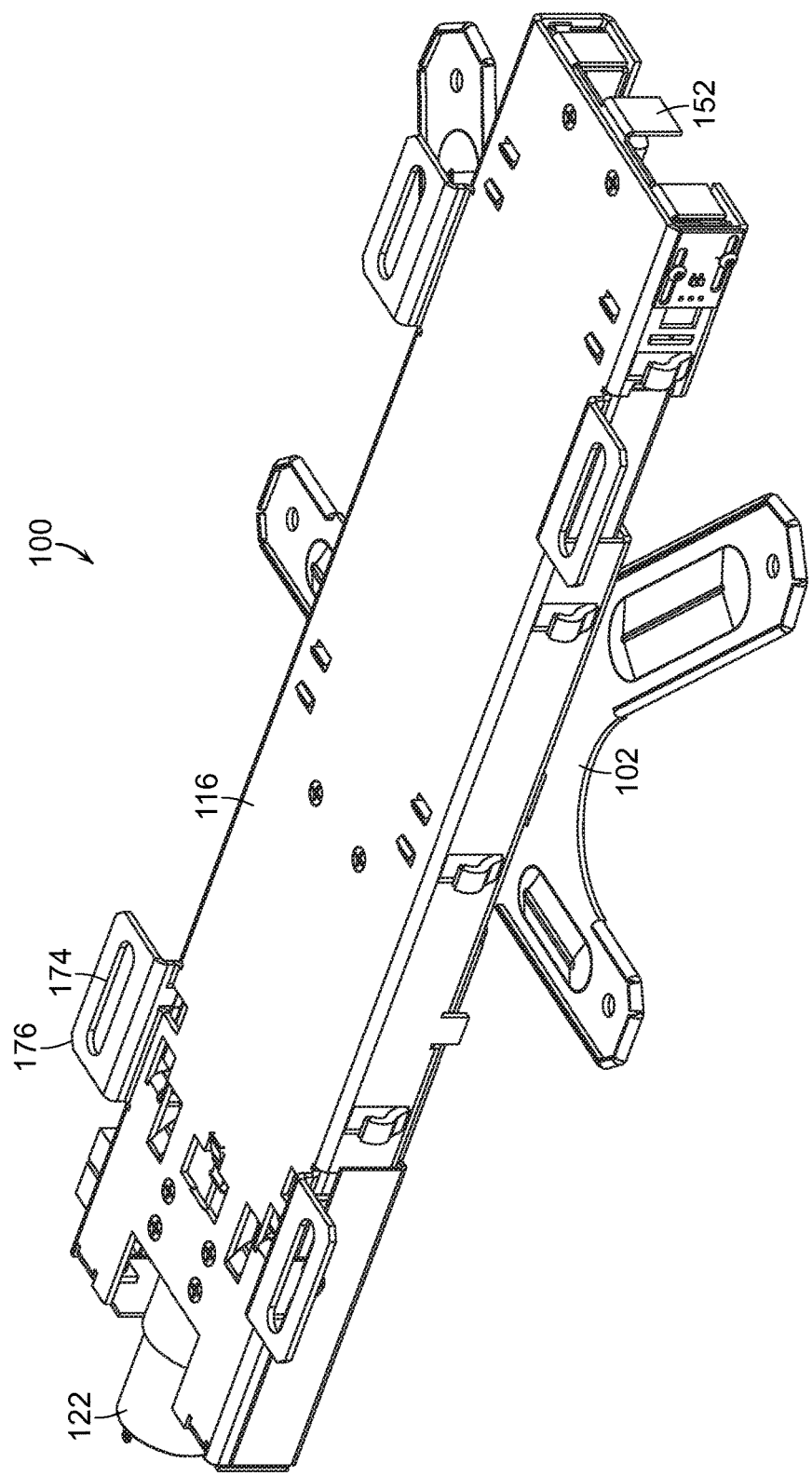
FIG. 9 is a top perspective view of the assembly of FIG. 8 in a completely retracted position.

With reference to FIG. 9, a top view of the assembly 100 with the license plate holder 102 in a fully retracted position is shown. The assembly 100 is mounted to an underside of the vehicle 2, typically at the front end thereof adjacent to a front bumper 8 of the vehicle. Apertures, typically in the form of slots 174 are formed in the outer housing 116, such as through wings 176 extending from the housing 116 to allow the insertion of screws, bolts or other fasteners through the slots 174 and into desirable attachment points of the vehicle. Due to the variety of front ends, each vehicle might require different mounting configurations, depending upon whether the vehicle has a spoiler lip, air dam or also depending upon the front end and bumper configuration of that particular vehicle. The assembly 100 needs to be mounted such that when the license plate mount 102 is fully extended, a license plate 4 is disposed in front of the vehicle, typically in front of the front bumper 8. Use of the elongated slots 174 enables the assembly 100 to be attached to the vehicles having the different configurations.

FIG. 10 illustrates a bottom view of the assembly 100, illustrating the positioning of the various component parts thereof when the license plate holder 102 is in a fully retracted position under the vehicle 2. The cover 172 is omitted in order to enable viewing of various component parts of the assembly 100.

Figure 11:
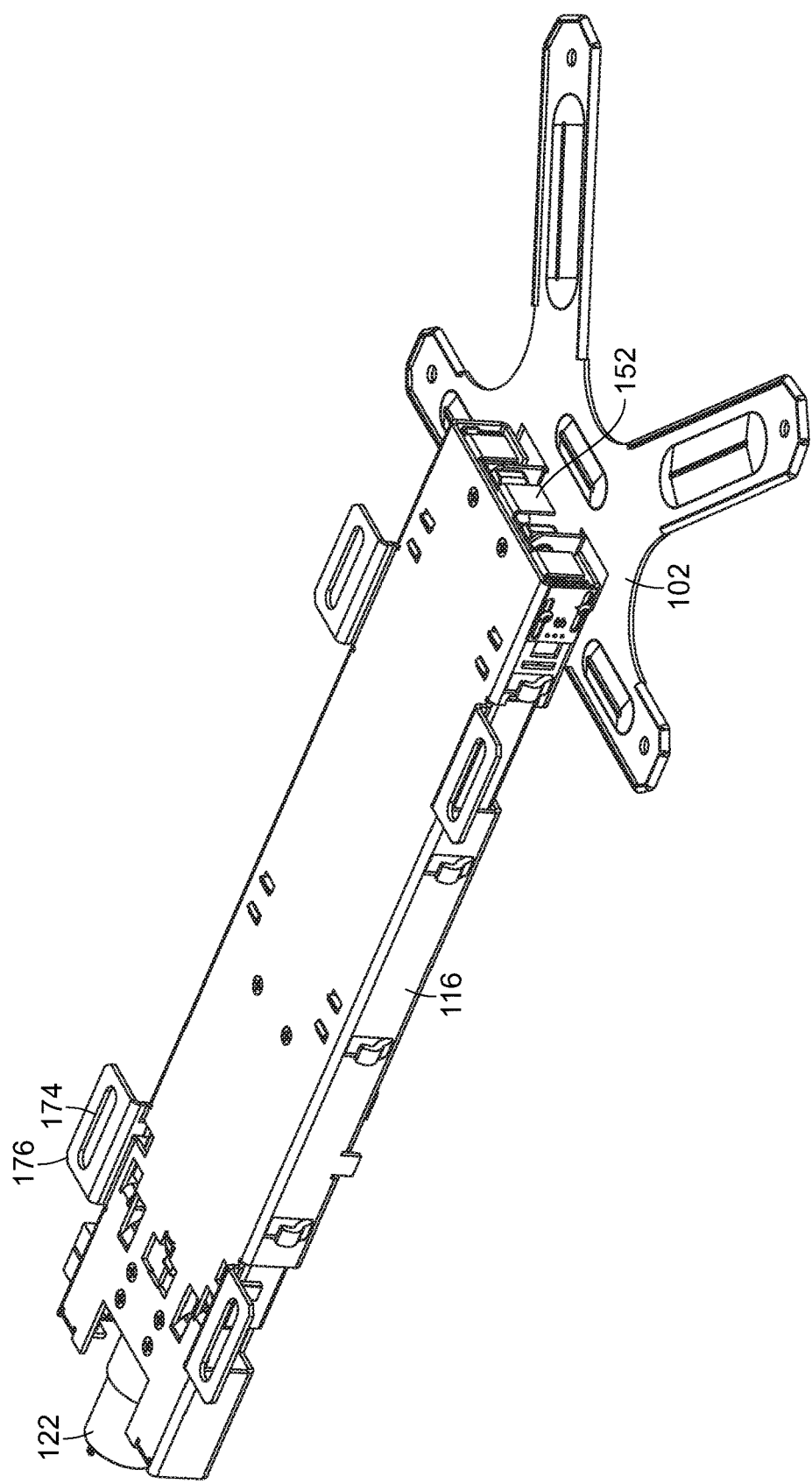
FIG. 11 is a top perspective view of the assembly in a partially extended position.
Figure 13:
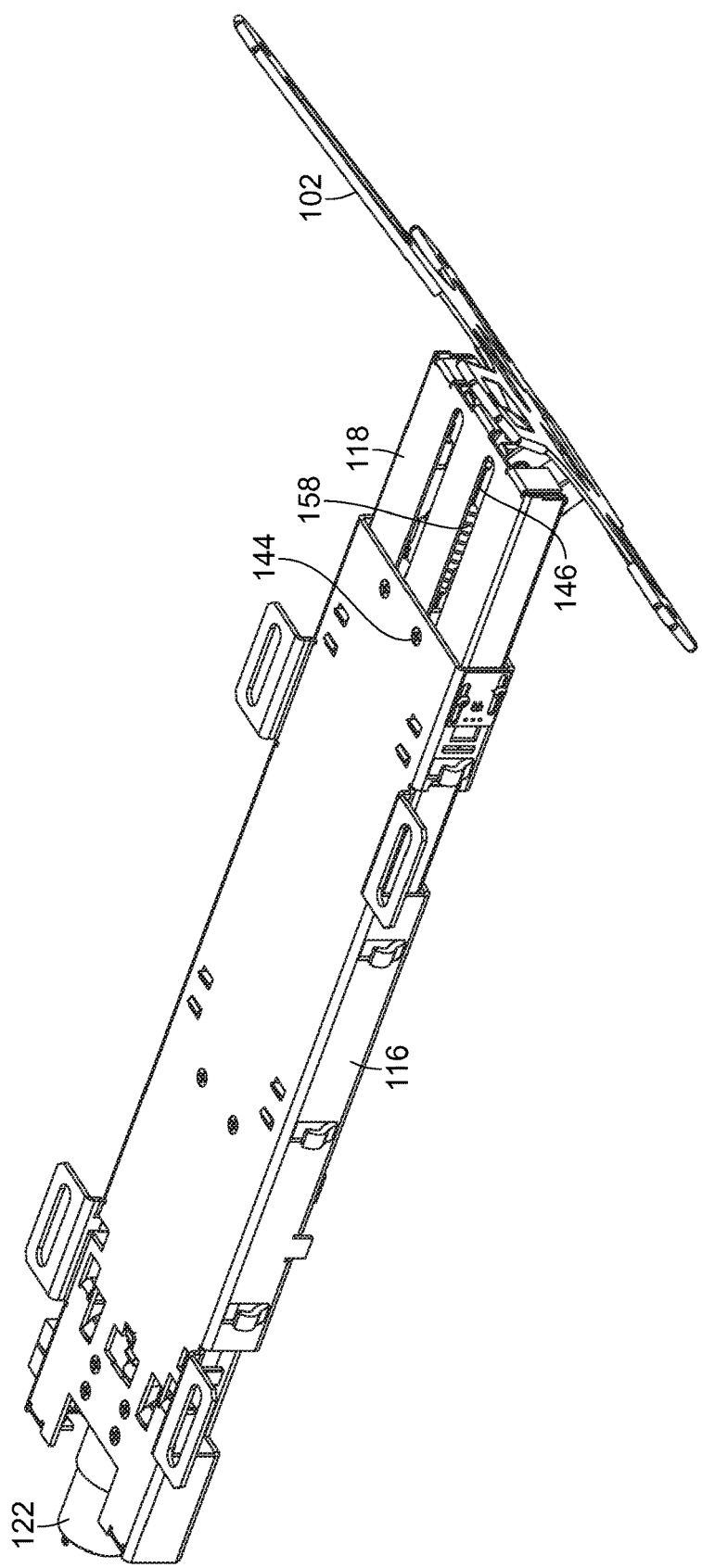
FIG. 13 is a top perspective view of the assembly illustrating a license plate mount further extended.
Figure 14:
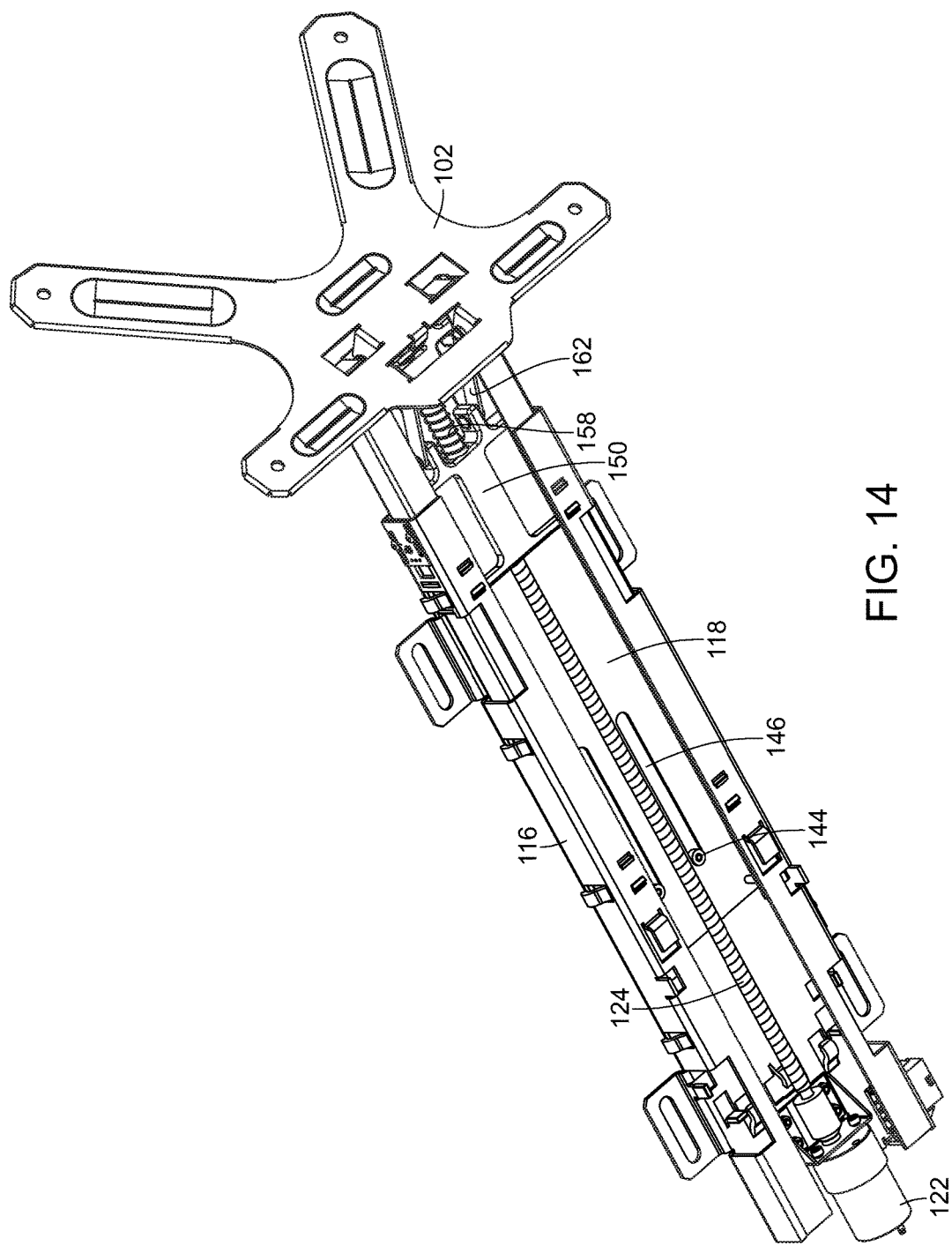
FIG. 14 is a bottom view similar to FIG. 13.
Figure 15:
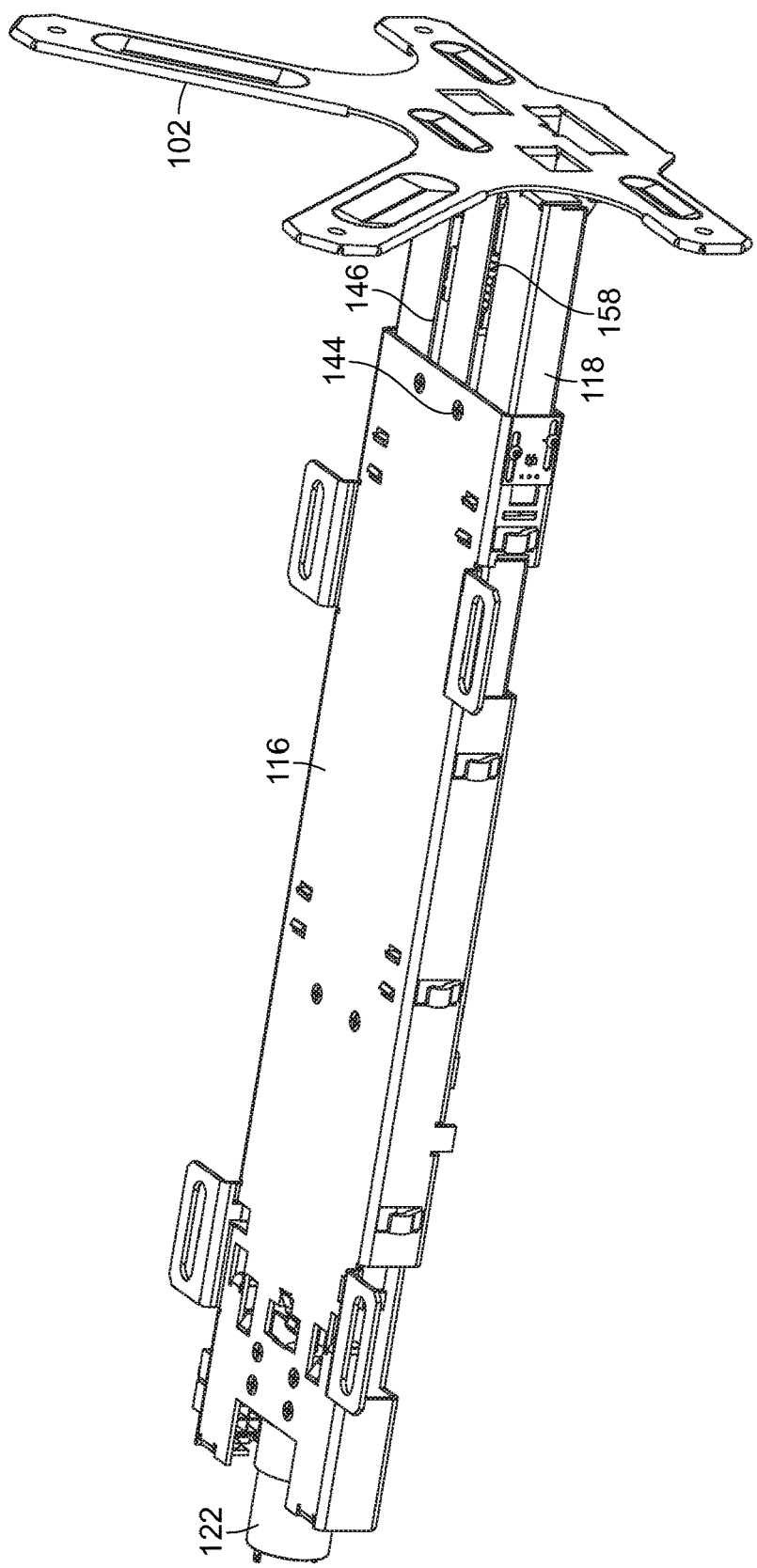
FIG. 15 is a top perspective view illustrating the license plate mount of the assembly in a fully extended position.
Figure 16:
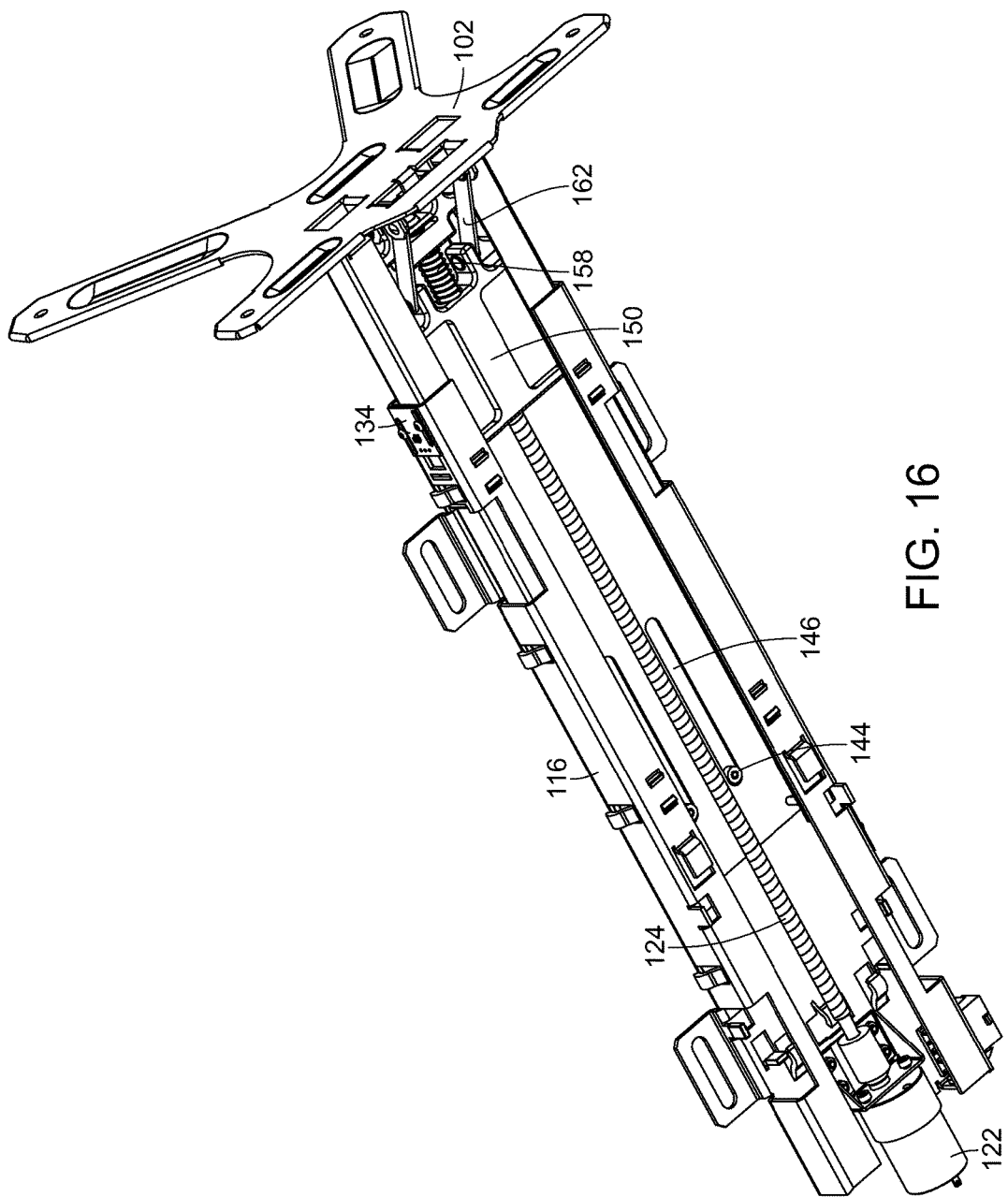
FIG. 16 is a bottom perspective view of the assembly of FIG. 15.
Figure 17:
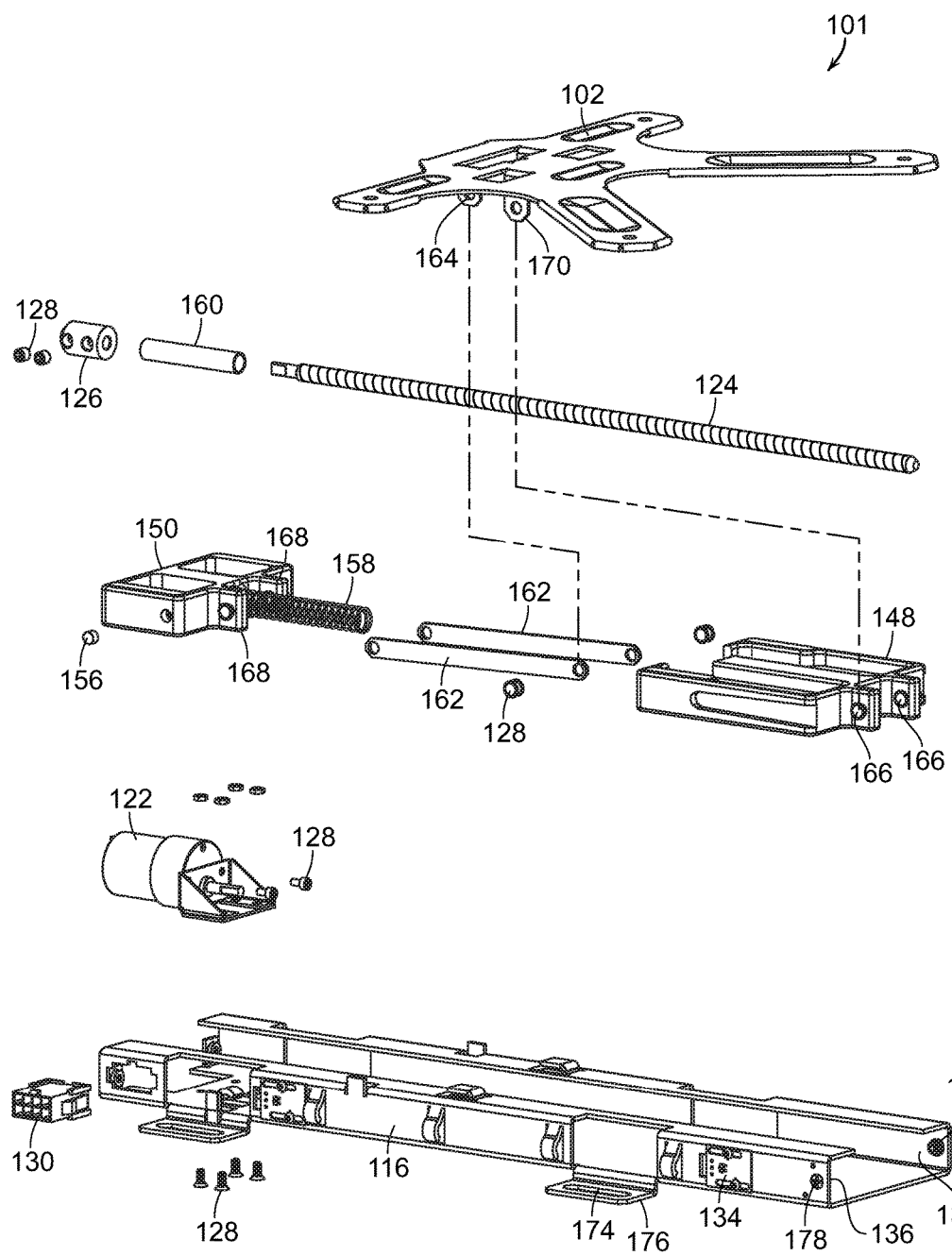
FIG. 17 is an exploded perspective view of another assembly embodying the present invention.

FIGS. 11-16 illustrate the moving of the license plate mount 102 from the fully retracted position in FIGS. 9 and 10 to the fully extended position in FIGS. 15 and 16. As the motor is actuated so as to rotate the driver 124 in a first direction, the first and second sliders 148 and 150 are moved towards the front end of the internal slide rail 118 until the first slider 148 encounters stop 152. This will extend the license plate mount 102 at the far front end of the outer housing or slide rail 116, as illustrated in FIGS. 11 and 12. With reference to FIGS. 13 and 14, once the first slider 148 encounters its stop, the motor 122 is still rotating the threaded driver 124, causing the inner slide rail 118 to be pushed outwardly and extend from the outer slide rail or outer housing 116, as illustrated. This travel occurs until the stop 144 engages the end of slot 146 of the inner slide rail 118, as illustrated in FIG. 14. As illustrated in FIG. 14, links 162 begin to pivot due to the second slider 150 becoming increasingly close to first slider 148, causing the license plate mount 102 to pivot into an extended position. At this point, spring 158 is beginning to be compressed. However, the motor 122 continues to turn the driver 124 in the first direction, causing the second slider 150 to continue to move towards the first slider 148, further compressing spring 158 and causing links 162 to continue to further pivot and extend at an angle away from its generally horizontal position, as illustrated in FIG. 16, causing the license plate holder 102 to extend into its most fully extended position, as illustrated in FIGS. 15 and 16.

The motor 122 will stop rotating driver 124 at this position. This could be determined by a set period of time for rotating the driver 124 in the first direction which will be calculated to fully extend the license plate holder 102. Alternatively, or additionally, sensors 134 may detect the forward-most position of the second slider 150 and upon the slider 150 reaching this position signaling to the circuit board 132 to cut power to the motor 122.

In order to retract the license plate holder 102, the motor 122 has power applied thereto and rotates the driver 124 in the opposite second direction, causing the second slider 150 to move away from the first slider 148, which will result in the links 162 moving from their angled position, illustrated in FIG. 16, towards their generally horizontal position generally aligned with the first and second sliders 148 and 150, as illustrated in FIG. 12, causing the license plate mount 102 to pivot and retract under the vehicle 2. As this occurs, the inner slide rail 118 will also become retracted into the outer slide rail or outer housing 116. This occurs, for example, until the second slider 150 engages the back stops 154 of the inner rail 118, sensors detect the necessary positions of various components, such as the first and/or second sliders 148 and 150 or inner slide rail 118, or a predetermined period of time that the motor 122 has been powered has occurred or a predetermined number of rotations of driver 124 has occurred, which are calculated to fully retract the license plate holder 102 into the position illustrated in FIGS. 9 and 10.

With reference now to FIGS. 17-22, another embodiment of the assembly 101 is illustrated which is very similar to embodiment 100 illustrated and described above, with the primary exception that it does not incorporate an inner slide rail 118. Instead, first and second sliders 148 and 150 slidably reside within the outer slide rail or outer housing 116. This may be, for example, with the outer edges of the first and second sliders 148 and 150 residing within the inner channels 136 and 138 of the slide rail 116. Anti-friction pads, low-friction material, or the like may be incorporated to assist the first and second sliders 148 and 150 to slidably move within the slide rail 116.

Once again, driver 124 is operably coupled to the motor 122, such as by coupling 126. The driver 124 operably extends through the first and second sliders 148 and 150, such that as the driver 124 is rotated, the first and second sliders 148 and 150 are moved linearly in first and second directions along a length of the outer slide rail 116. Also, links 162 are pivotally connected to the second slider 150, such as at connection points 168, and at an opposite end to pivotal connection points of the license plate mount 102, such as 164. The license plate mount 102 is also pivotally connected to the first slider 148, such as at connection points 166 and 170, similar to that described above.

Figure 18:
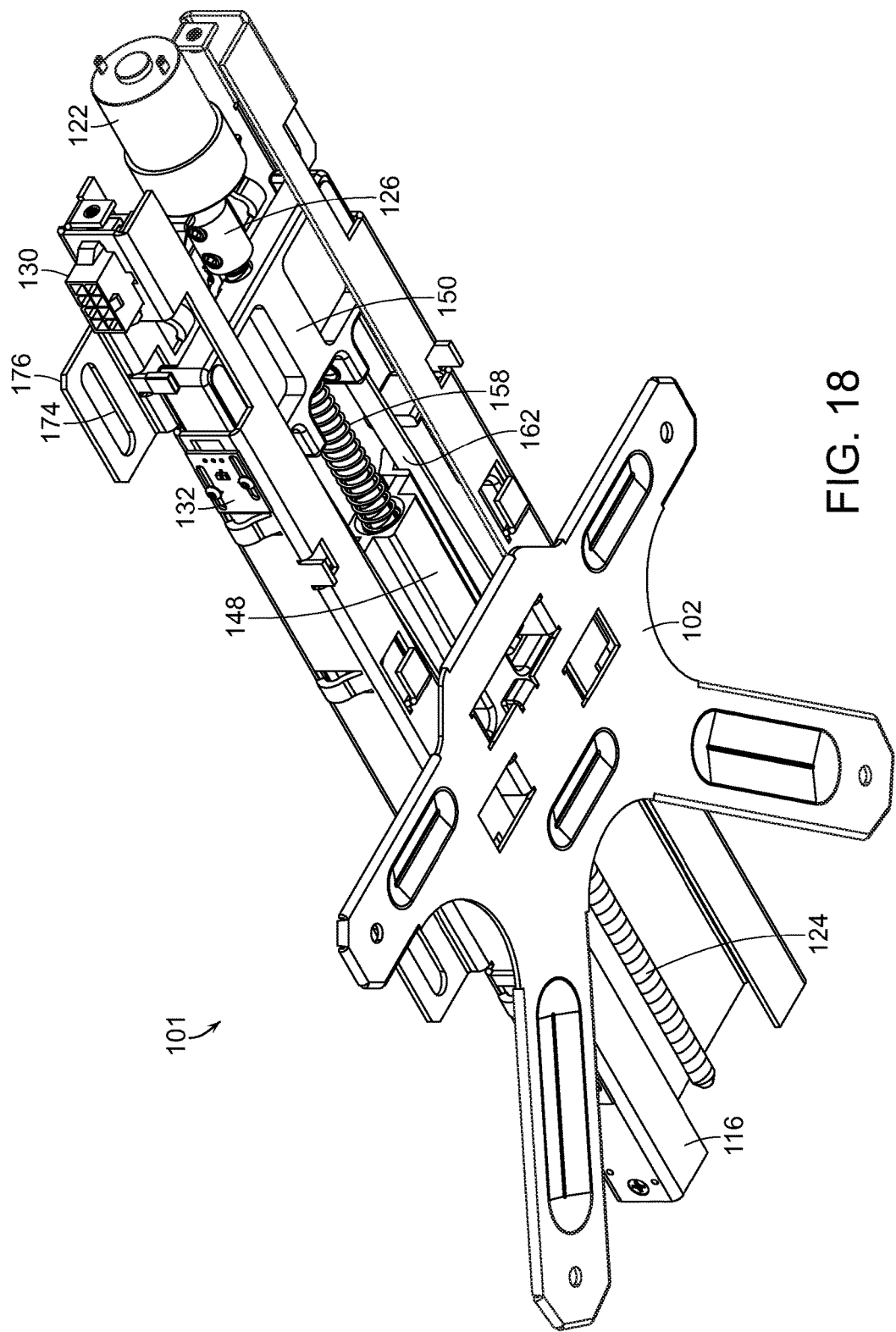
FIG. 18 is a bottom perspective view of the assembly of FIG. 17, illustrating the license plate mount in a fully retracted position.
Figure 19:
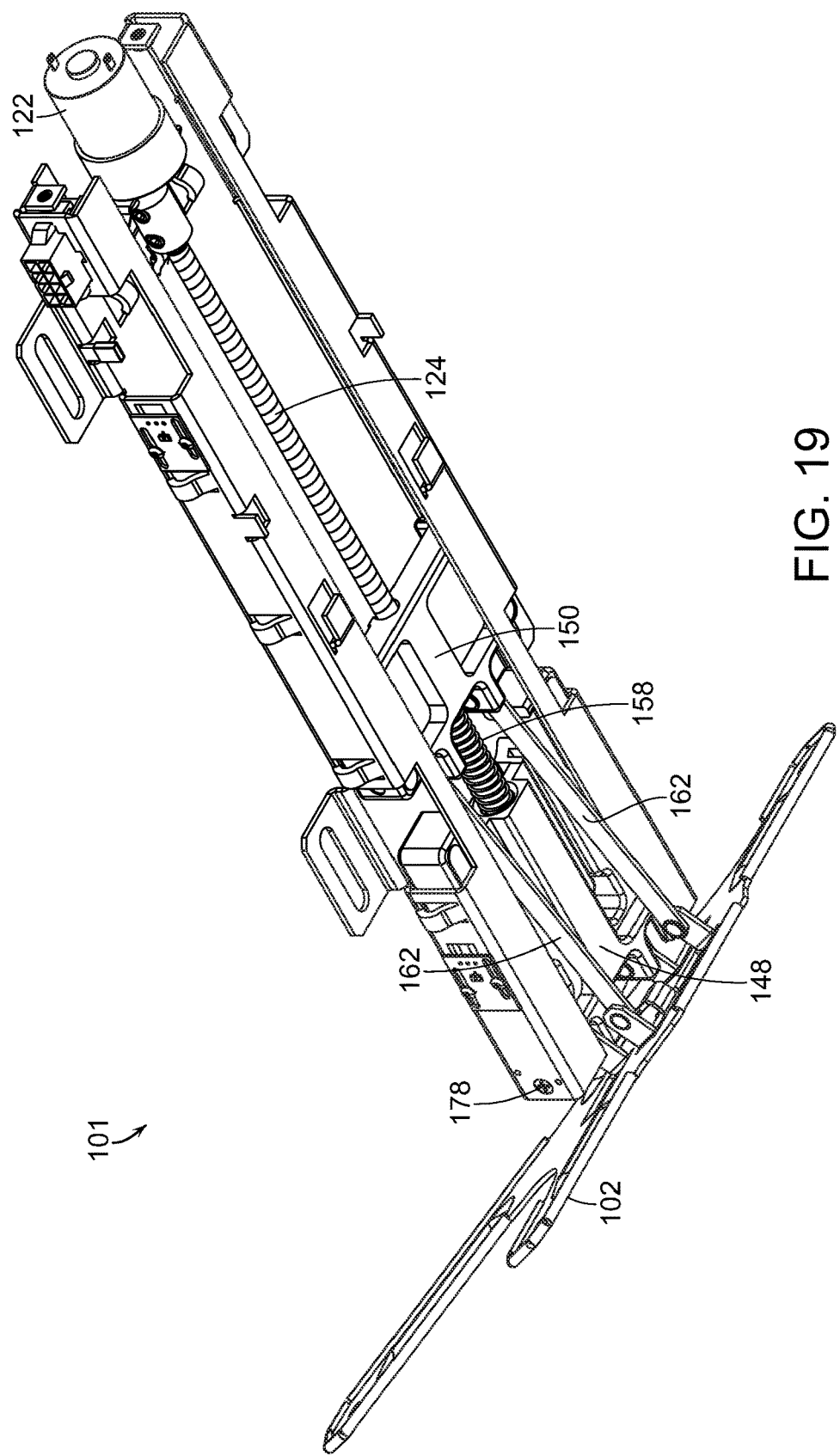
FIG. 19 is a bottom perspective view of the assembly of FIG. 17, illustrating the license plate mount of the assembly in a partially extended position.
Figure 20:
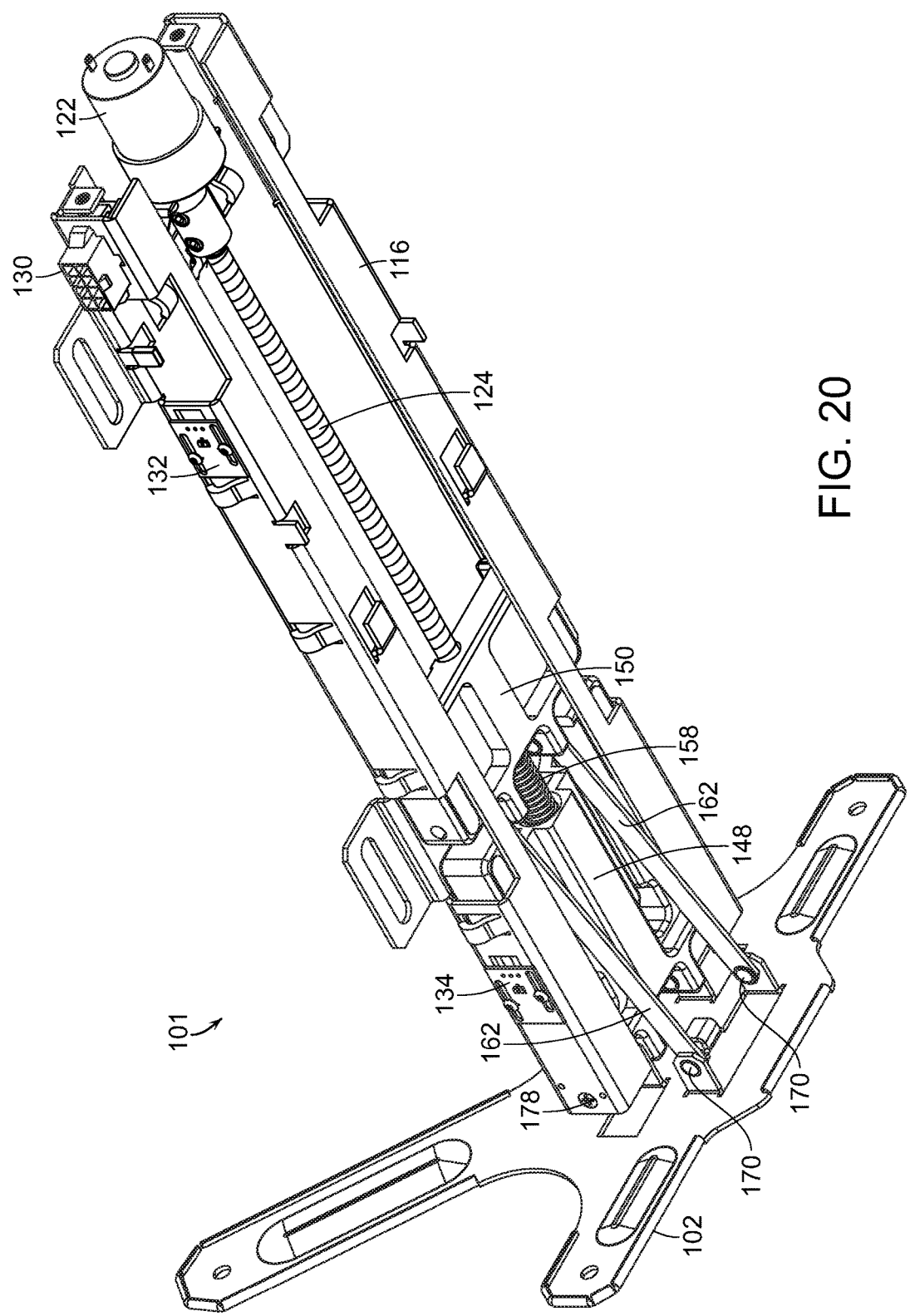
FIG. 20 is a bottom perspective view of the assembly of FIG. 17 illustrating the license plate mount in a fully extended position.

FIGS. 18-20 illustrate the assembly 100 at various stages of license plate mount retraction and extension, with FIG. 18 illustrating the license plate holder 102 in a fully retracted position and the first and second sliders 148 and 150 move towards the back of the outer slide rail 116 and 122, and FIG. 20 illustrating the license plate holder 102 in a fully extended position, with the first and second sliders 148 and 150 being moved towards the front of the outer housing or slide rail 116. Similar to that described above, when the second slider 150 is in a spaced relation with respect to the first slider 148, the links 162 are retracted and in a generally horizontal position, which causes the license plate holder 102 to be in a retracted position, as illustrated in FIG. 18. However, as the motor is powered and the driver 124 rotated, such as in a first direction, the first and second sliders 148 and 150 are advanced towards the front or open end of the outer housing 116 until the first slider 148 is stopped, such as encountering stops 178. However, the driver 124 continues to turn, causing the second slider 150 to continue to move towards the first slider 148, compressing spring 158 and causing the links 162 to pivot outwardly at an angle, causing the license plate holder 102 to pivot towards an extended position, as illustrated in FIG. 19. This occurs until the second slider 150 is advanced to its most forward position, illustrated in FIG. 20, compressing spring 158 and causing the links 162 to move to an angled position, causing the license plate holder 102 to pivot to a fully extended position.

Figure 21:
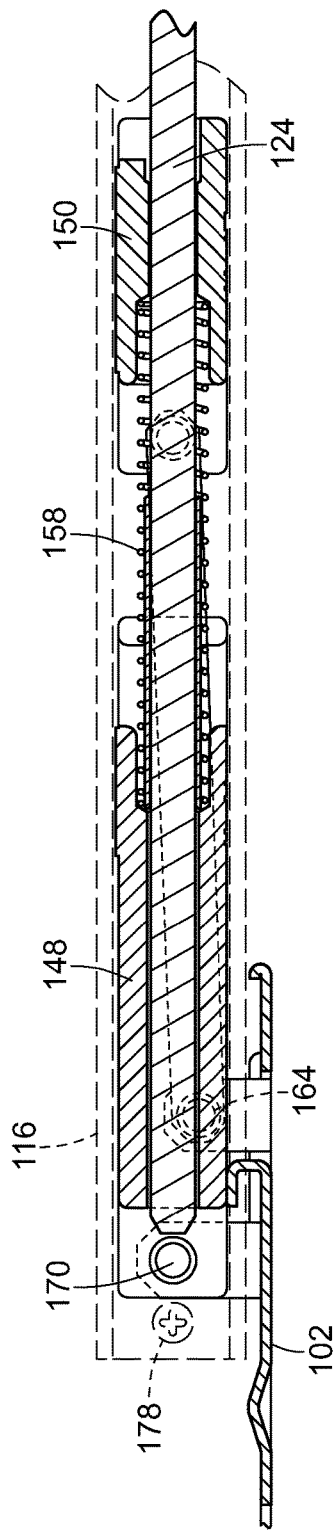
FIG. 21 is a cross-sectional view of the assembly of FIG. 18, with the license plate mount in a retracted position.
Figure 22:
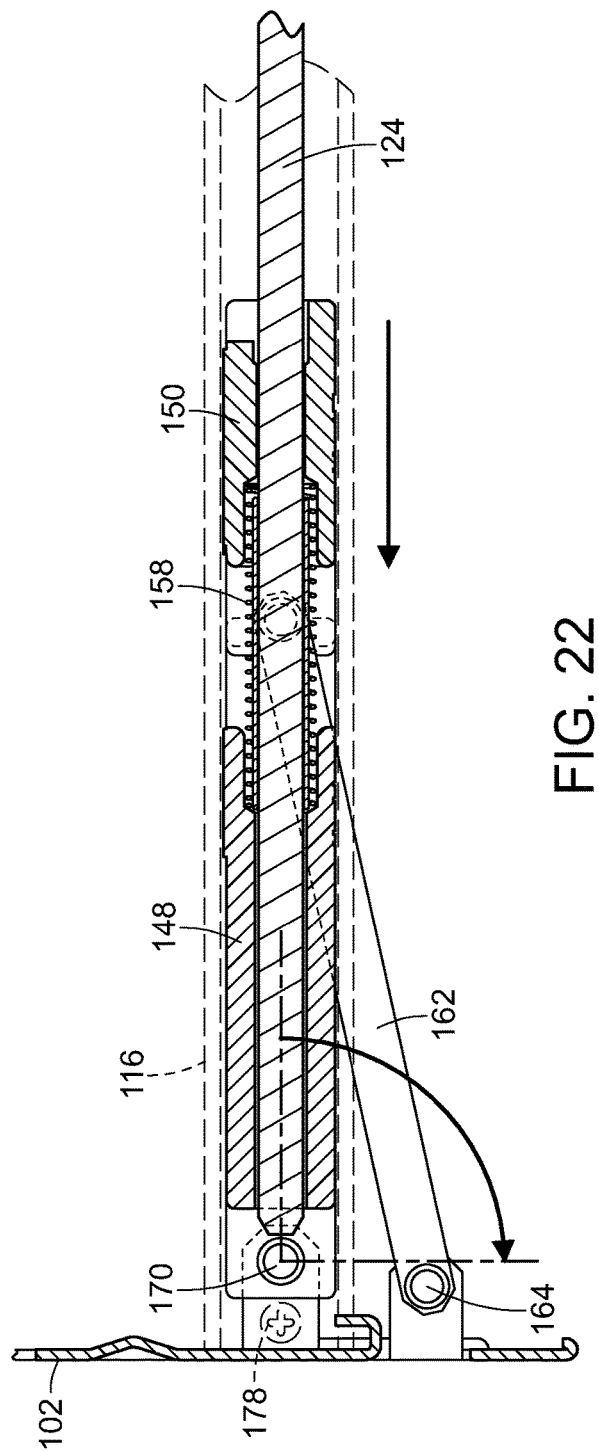
FIG. 22 is a cross-sectional view illustrating movement of component parts thereof in order to fully extend the license plate mount, in accordance with the present invention.

FIGS. 21 and 22 are cross-sectional views of the assembly 101 in a retracted and fully extended position, respectively. FIG. 21 corresponds with the position of the components in FIG. 18, wherein the first and second sliders 148 and 150 have been moved into their rearward position, causing the license plate mount or holder 102 to be in a retracted position. However, as the driver 124 is rotated in a first direction, the sliders 148 and 150 advance forward until first slider 148 encounters stop 170. However, the driver 124 continues to rotate, causing the second slider 150 to advance closer to first slider 148, compressing spring 158 and causing the links 162 to pivot outwardly at an angle, also pivoting the license plate holder 102 into an extended position, until it is fully extended, as illustrated in FIG. 22, at which point the driver 124 will stop turning. This may be due, as explained above, to the motor having electricity supplied thereto for a predetermined period of time, a predetermined number of rotations of the driver 124, or the use of the sensors 134. In order to retract the license plate holder 102, the opposite steps are taken until the components are in the position illustrated in FIGS. 18 and 21. It will be understood that when the license plate holder 102 is in its fully most extended position, as illustrated in FIG. 22, the license plate of the vehicle will be visible from outside of the vehicle. However, when the license plate holder 102 is retracted, as illustrated in FIGS. 18 and 21, the license plate will be retracted underneath the vehicle and will not be visible.

Although several embodiments have been described in detail for purposes of illustration, various modifications may be made without departing from the scope and spirit of the invention. Accordingly, the invention is not to be limited, except as by the appended claims.

What is claimed is:

1. A system for selectively extending and retracting a license plate holder, the system comprising:
   a housing comprising a slide rail attachable to a vehicle;
   a threaded driver disposed within the slide rail and operably coupled to a motor for selectively rotating the threaded driver in a first rotational direction or a generally opposite second rotational direction;
   a first slider slidably disposed within the slide rail and operably coupled to the driver so as to move in a first and a second generally opposite direction along a length of the driver as the driver is rotated;
   a second slider disposed within the slide rail in spaced relation to the first slider and operably coupled to the driver to move in first and second generally opposite directions along a length of the driver as the driver is rotated;
   a spring disposed between the first and second sliders for biasing the first and second sliders in spaced relation to one another; and
   a license plate mount pivotally attached to the first slider;
   wherein when the driver is rotated in the first rotational direction, the first slider moves in the first direction a predetermined distance, and the license plate mount pivots to an extended position; and
   wherein when the driver is rotated in the generally opposite second rotational direction, the first slider moves in the second direction and the license plate mount pivots to a retracted position.

2. The system of claim 1, including a stop for limiting the travel of the first slider in the first direction.

3. The system of claim 1, including a sensor for detecting a position of the first slider and/or the second slider.

4. The system of claim 1, including an inner slide rail slidably disposed within the housing.

5. The system of claim 4, wherein the first slider and the second slider are slidably disposed within the inner slide rail.

6. The system of claim 4, including a stop for limiting travel of the inner slide rail within the housing.

7. A system for selectively extending and retracting a license plate holder, the system comprising:
   a housing comprising a slide rail attachable to a vehicle;
   a threaded driver disposed within the slide rail and operably coupled to a motor for selectively rotating the threaded driver in a first rotational direction or a generally opposite second rotational direction;
   a first slider slidably disposed within the slide rail and operably coupled to the threaded driver so as to move in a first and a second generally opposite direction along a length thereof as the driver is rotated;
   a second slider slidably disposed within the slide rail and operably coupled to the threaded driver so as to move in first and second generally opposite directions along a length thereof as the threaded driver is rotated;
   a license plate mount pivotally attached to the second slider; and
   a link extending between the first slider and the license plate mount;
   wherein when the threaded driver is rotated in the first rotational direction, the first slider moves towards the second slider and a distance between the first slider and the license plate mount becomes less than a length of the link, and the license plate mount pivots to an extended position; and
   wherein when the threaded driver is rotated in the generally opposite second rotational direction, and the first slider moves away from the license plate mount, the link causes the license plate mount to pivot to a retracted position.

8. The system of claim 7, including a spring disposed between the first and second sliders for biasing the first and second sliders in spaced relation to one another.

9. The system of claim 7, including a stop for limiting the travel of the first slider in the first direction.

10. The system of claim 7, including a sensor for detecting a position of the first slider and/or the second slider.

11. The system of claim 7, including an inner slide rail slidably disposed within the housing.

12. The system of claim 11, wherein the first slider and the second slider are slidably disposed within the inner slide rail.

13. The system of claim 11, including a stop for limiting travel of the inner slide rail within the housing.

14. A system for selectively extending and retracting a license plate holder, the system comprising:
- a housing comprising a slide rail attachable to a vehicle;
- a threaded driver disposed within the slide rail and operably coupled to a motor for selectively rotating the threaded driver in a first rotational direction or a generally opposite second rotational direction;
- a first slider slidably disposed within the slide rail and operably coupled to the threaded driver so as to move in a first and a second generally opposite direction along a length thereof as the driver is rotated;
- a second slider slidably disposed within the slide rail and operably coupled to the threaded driver so as to move in first and second generally opposite directions along a length thereof as the threaded driver is rotated;
- a spring disposed between the first and second sliders for biasing the first and second sliders in spaced relation to one another;
- a stop for limiting the travel of the first slider in the first direction;
- a sensor for detecting a position of the first slider and/or the second slider;
- a license plate mount pivotally attached to the second slider; and
- a link extending between the first slider and the license plate mount;
- wherein when the threaded driver is rotated in the first rotational direction, the first slider moves towards the second slider and a distance between the first slider and the license plate mount becomes less than a length of the link, and the license plate mount pivots to an extended position; and
- wherein as the threaded driver is rotated in the general opposite second rotational direction and the first slider moves away from the license plate mount, the link causes the license plate mount to pivot to a retracted position.

15. The system of claim 14, including an inner slide rail slidably disposed within the housing.

16. The system of claim 15, wherein the first slider and the second slider are slidably disposed within the inner slide rail.

17. The system of claim 15, including a stop for limiting travel of the inner slide rail within the housing.

18. A system for selectively extending and retracting a license plate holder, the system comprising:
- a housing comprising a slide rail attachable to a vehicle;
- an inner slide rail slidably disposed within the housing;
- a threaded driver disposed within the slide rail and operably coupled to a motor for selectively rotating the threaded driver in a first rotational direction or a generally opposite second rotational direction;
- a first slider slidably disposed within the slide rail and operably coupled to the driver so as to move in a first and a second generally opposite direction along a length of the driver as the driver is rotated;
- a second slider disposed within the slide rail in spaced relation to the first slider and operably coupled to the driver to move in first and second generally opposite directions along a length of the driver as the driver is rotated; and
- a license plate mount pivotally attached to the first slider;
- wherein when the driver is rotated in the first rotational direction, the first slider moves in the first direction a predetermined distance, and the license plate mount pivots to an extended position; and
- wherein when the driver is rotated in the generally opposite second rotational direction, the first slider moves in the second direction and the license plate mount pivots to a retracted position.

19. The system of claim 18, wherein the first slider and the second slider are slidably disposed within the inner slide rail.

20. The system of claim 18, including a stop for limiting travel of the inner slide rail within the housing.

\* \* \* \* \*